US009172488B2

(12) United States Patent
Sato et al.

(10) Patent No.: US 9,172,488 B2
(45) Date of Patent: Oct. 27, 2015

(54) OPTICAL TERMINATING APPARATUS FOR OPTICAL PATH NETWORK

(75) Inventors: Ken-ichi Sato, Nagoya (JP); Hiroshi Hasegawa, Nagoya (JP); Ryosuke Hirako, Nagoya (JP)

(73) Assignee: NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 291 days.

(21) Appl. No.: 13/822,889

(22) PCT Filed: Sep. 12, 2011

(86) PCT No.: PCT/JP2011/070700
§ 371 (c)(1),
(2), (4) Date: Sep. 19, 2013

(87) PCT Pub. No.: WO2012/036112
PCT Pub. Date: Mar. 22, 2012

(65) Prior Publication Data
US 2014/0029942 A1    Jan. 30, 2014

(30) Foreign Application Priority Data

Sep. 13, 2010   (JP) ................................ 2010-204978

(51) Int. Cl.
*H04J 14/02*    (2006.01)
(52) U.S. Cl.
CPC ......... *H04J 14/0202* (2013.01); *H04J 14/0204* (2013.01); *H04J 14/0205* (2013.01);
(Continued)
(58) Field of Classification Search
None
See application file for complete search history.

(56) References Cited

U.S. PATENT DOCUMENTS

| 6,792,208 B1* | 9/2004 | Mukherjee et al. ............. 398/52 |
| 2002/0054407 A1* | 5/2002 | Yamada et al. ............... 359/128 |
| 2004/0153492 A1* | 8/2004 | Cao et al. ...................... 709/200 |

FOREIGN PATENT DOCUMENTS

| EP | 1628424 A2 | 2/2006 |
| JP | A 9-200807 | 7/1997 |

(Continued)

OTHER PUBLICATIONS

Kakehashi, S.; Hasegawa, H.; Sato, K.; Moriwaki, O., "Interleaved Waveband MUX/DEMUX Developed on Single Arrayed-Waveguide Grating," Optical Fiber communication/National Fiber Optic Engineers Conference, 2008. OFC/NFOEC 2008. Conference on , vol., No., pp. 1,3, Feb. 24-28, 2008.*

(Continued)

*Primary Examiner* — Ken Vanderpuye
*Assistant Examiner* — Merlin Brito Peguero
(74) *Attorney, Agent, or Firm* — Oliff PLC

(57) ABSTRACT

An optical signal terminating apparatus for an optical path network includes: a variable filter selecting an optical signal of a predetermined wavelength path making up any one of a plurality of wavebands included in one wavelength division multiplexing light selected from a plurality of wavelength division multiplexing lights respectively transmitted in parallel via a plurality of optical fibers to a relay node in the optical path network, the variable filter dropping the optical signal to an electric layer, the variable filter including a waveband separator separating the wavelength division multiplexing light into a plurality of wavebands, a waveband selector selecting one waveband from a plurality of wavebands separated by the waveband separator, a wavelength separator separating one waveband selected by the waveband selector into wavelengths, and a drop wavelength selector.

4 Claims, 27 Drawing Sheets

(52) U.S. Cl.
CPC ......... *H04J14/0208* (2013.01); *H04J 14/0209* (2013.01); *H04J 14/0212* (2013.01); *H04J 14/0213* (2013.01); *H04J 14/0217* (2013.01); *H04Q 2213/1301* (2013.01)

(56) References Cited

FOREIGN PATENT DOCUMENTS

| | | |
|---|---|---|
| JP | A 2002-152784 | 5/2002 |
| JP | A 2008-252664 | 10/2008 |

OTHER PUBLICATIONS

Feb. 13, 2015 European Search Report issued in European Patent Application No. 11825114.9.

Ishii et al; "Development of Hierarchical Optical Path Cross-Connect Systems Employing Wavelength/Waveband Selective Switches;" IEEE/OSA Journal of Optical Communications and Networking, IEEE, USA; Jul. 1, 2011; vol. 3; No. 7; pp. 559-567.

Mitsui et al; "Low loss and cost-effective hierarchical optical path cross-connect switch architecture based on WSS/WBSS" Photonics in Switching, 2009. PS '09. International Conference on, IEEE, Piscataway, NJ, USA; Sep. 15, 2009; pp. 1-2.

Kakehashi et al; "Analysis and Development of Fixed and Variable Waveband MUX/DEMUX Utilizing AWG Routing Functions;" Journal of Lightwave Technology; Jan. 1, 2009; vol. 27; No. 1; pp. 30-40.

Gringeri et al; "Flexible Architectures for Optical Transport nodes and Networks", IEEE Communications Magazine; Jul. 1, 2010; pp. 40-50.

Ji et al; "Colorless and directionless multi-degree reconfigurable optical add/drop multiplexers;" Wireless and Optical Communications Conference (WOCC); May 14, 2010; pp. 1-5.

Hirako et al; "Hierarchical optical cross-connect architecture that implements colorless waveband add/drop ratio restriction utilizing a novel wavelength multildemultiplexers;" Photonics in Switching, 2009. PS '09. International Conference on, IEEE, Piscataway, NJ, USA; Sep. 15, 2009. pp. 1-2.

Oct. 18, 2011 Search Report issued in International Patent Application No. PCT/JP2011/070700 (with translation).

May 26, 2015 Office Action issued in Chinese Patent Application No. 201180054247.6.

\* cited by examiner

OPTICAL TERMINATING APPARATUS FOR OPTICAL PATH NETWORK

TECHNICAL FIELD

The present invention relates to an optical terminating apparatus in an optical path network transmitting wavelength division multiplexing light consisting of, for example, M wavebands each having a plurality of, for example, N, wavelength channels via each of a plurality of, for example, K, optical fibers in parallel, the optical terminating apparatus extracting and dropping a predetermined wavelength from KMN wavelength channels included in wavebands transmitted through the K optical fibers to an electric layer (electric level) EL disposed with a router etc., for signal conversion between electric signals and wavelength-based optical signals or converting an electric signal into a wavelength channel to add the wavelength channel to wavelength division multiplexing light in a predetermined optical fiber, in a relay node switching a route for each waveband or switching a route for each wavelength.

BACKGROUND ART

An optical path network is known that transmits wavelength division multiplexing (WDM) light including a plurality of (M) wavebands each formed by combining lights of a plurality of, i.e., N, wavelengths respectively corresponding to a plurality of (N) wavelength channels (wave channels or light paths) divided by, for example, 100 GHz in a predetermined communication wavelength range via a plurality of (K) optical fibers in parallel. In each relay node of such an optical path network, wavelength division multiplexing lights respectively transmitted through the K optical fibers are subjected to route switching on the basis of a waveband or on the basis of a wavelength division multiplexing light group directly to an optical fiber in a predetermined transmission direction, and a wavelength (channel) included in the waveband is separated and dropped (output) to an electric layer as needed, or a waveband recombined into wavelength division multiplexing light including a wavelength channel acquired by converting a signal added from the electric layer into light is subjected to route switching to an optical fiber in a predetermined transmission direction. For example, this corresponds to an optical path cross-connect apparatus described in Patent Document 1.

It is desired to have a function enabling any wavelength channel in wavelength division multiplexing light in any input fiber to be dropped to a connection port to an arbitrary electric layer (electric level) EL and enabling an added wavelength channel to be allocated into an arbitrary wavelength division multiplexing light waveband between a wavelength level for transmission through optical paths and an electric level at the time of an optical signal termination process in a relay node of the optical path network, i.e., a colorless, directionless, and contentionless function.

PRIOR ART DOCUMENTS

Patent Documents

Patent Document 1: Japanese Laid-Open Patent Publication No. 2008-252664

SUMMARY OF THE INVENTION

Problems to Be Solved by the Invention

However, the implementation of the colorless, directionless, and contentionless function in a conventional relay node requires a huge multi-input multi-output optical switch, causing technical and cost problems. For example, when wavelength division multiplexing light including M wavebands each acquired by combining lights of N wavelength channels is transmitted through each of K optical fibers in parallel, if a rate of drop to or addition from an electric layer (electric level) EL for performing signal conversion between an electric signal and a wavelength-based optical signal through an optical router etc., is a predetermined add/drop rate z, an optical switch having a large scale of KMN×zKMN must be disposed on the drop side between K wavelength separators (e.g., arrayed waveguide gratings AWG) for separating wavelength division multiplexing light from the optical fibers into wavelengths and the electric layer capable of converting zKMN wavelength channels into electric signals as depicted in a conventional configuration (1) of FIG. 46, for example. At the same time, an optical switch having a large scale of zKMN×KMN must be disposed on the add side between K wavelength combiners (e.g., arrayed waveguide gratings AWG) for combining added wavelengths into wavelength division multiplexing light to any optical fiber and the electric layer capable of converting zKMN electric signals into wavelength channels.

In this regard, to implement the colorless, directionless, and contentionless function without using the huge multi-input multi-output optical switch, for example, as depicted in a conventional configuration (2) of FIGS. 47 and 48, a proposal may be made to dispose zKMN variable filters (tunable filters) on the drop side between zKMN 1×K optical switches for selecting a fiber including a wavelength channel desired to be dropped and zKMN optical receivers in an electric layer capable of converting zKMN wavelength channels into electric signals. This proposal is not known. The variable filter is a variable filter formed by disposing MN on/off optical switches between a 1-by-MN-scale wavelength separator (e.g., arrayed waveguide grating AWG) separating a group of wavelength division multiplexing lights selected by the 1-by-K-scale optical switches into wavelengths and an MN-by-1-scale wavelength combiner (e.g., arrayed waveguide grating AWG). Therefore, a huge number of zKMN×MN on/off optical switches are required in total, causing a cost problem. Since the same zKMN variable filters are disposed on the add side at the same time between K K-by-1 optical switches for combining added wavelengths into wavelength division multiplexing light to any optical fibers and the electric layer capable of converting zKMN electric signals into wavelength channels, a huge number of zKMN×MN on/off optical switches are also required in total, causing a cost problem.

The present invention was conceived in view of the situations and it is therefore an object of the present invention to provide an optical terminating apparatus in a relay node for an optical path network capable of further reducing a scale of matrix optical switches.

Means for Solving the Problems

To achieve the object, the first aspect of the invention provides an optical signal terminating apparatus for an optical path network comprising: a variable filter selecting an optical signal of a predetermined wavelength path making up any one of a plurality of wavebands included in one wavelength division multiplexing light selected from a plurality of wavelength division multiplexing lights respectively transmitted in parallel via a plurality of optical fibers to a relay node in the optical path network, the variable filter dropping the optical signal to an electric layer, the variable filter separating the one wavelength division multiplexing light into a plurality of wavebands, the variable filter selecting one waveband from the plurality of the wavebands, the variable filter selecting and dropping one wavelength from a plurality of wavelengths making up the one selected waveband to one of a plurality of receivers included in the electric layer.

The second aspect of the invention provides the optical signal terminating apparatus recited in the first aspect of the invention, comprising (a) an optical branching device branching each of the wavelength division multiplexing lights from the plurality of the optical fibers, and (b) a plurality of matrix optical switches selecting one of a plurality of the wavelength division multiplexing lights branched from each of a plurality of the optical branching device to output the wavelength division multiplexing light to one of the plurality of the variable filters.

The third aspect of the invention provides the optical signal terminating apparatus, wherein the variable filter recited in the first or second aspect of the invention includes (1) a waveband separator separating the wavelength division multiplexing light into a plurality of wavebands, (2) a waveband selector selecting one waveband from a plurality of wavebands separated by the waveband separator, (3) a wavelength separator separating one waveband selected by the waveband selector into wavelengths, and (4) a drop wavelength selector selecting and dropping one wavelength from a plurality of the wavelengths separated by the wavelength separator to one of a plurality of receivers included in the electric layer.

The fourth aspect of the invention provides the optical signal terminating apparatus recited in any one of the first to third aspects of the invention, wherein the wavelength division multiplexing light is a sequentially-arranged waveband in which wavelengths making up each of a plurality of wavebands which constitute the wavelength division multiplexing lights are sequentially selected such that one band is made up of a plurality of wavelengths having lengths continuous to each other out of a plurality of wavelengths sequentially arranged in order of length of wavelength.

The fifth aspect of the invention provides the optical signal terminating apparatus recited in any one of the first to third aspects of the invention, wherein the wavelength division multiplexing light is a dispersively-arranged waveband in which wavelengths of a plurality of bands respectively making up a plurality of wavebands which constitute the wavelength division multiplexing lights are sequentially selected such that one band is made up of a plurality of wavelengths having lengths discontinuous to each other (uneven wavelength channel) out of a plurality of wavelengths sequentially arranged in order of length of wavelength.

The sixth aspect of the invention provides the optical signal terminating apparatus recited in the first aspect of the invention, having an add-side variable filter selecting optical signals of wavelength paths added from the electric layer to combine the selected wavelengths into wavebands and an add-side branching apparatus combining the combined wavebands into wavelength division multiplexing light to transfer the wavelength division multiplexing light to an optical fiber.

The Effects of the Invention

According to the first aspect of the invention, in an optical signal terminating apparatus for an optical path network comprising: a variable filter selecting an optical signal of a predetermined wavelength path making up any one of a plurality of wavebands included in one wavelength division multiplexing light selected from a plurality of wavelength division multiplexing lights respectively transmitted in parallel via a plurality of optical fibers to a relay node in the optical path network, the variable filter dropping the optical signal to an electric layer, the variable filter separates the one wavelength division multiplexing light into a plurality of wavebands, selects one waveband from the plurality of the wavebands, selects and drops one wavelength from a plurality of wavelengths making up the one selected waveband to one of a plurality of receivers included in the electric layer. Therefore, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact optical switches to implement the colorless, directionless, and contentionless function, thereby significantly reducing the scale of the terminating apparatus.

According to the second aspect of the invention, since the optical terminating apparatus recited in the first aspect of the invention includes (a) optical branching devices branching each of the wavelength division multiplexing lights from the plurality of the optical fibers and (b) a plurality of the matrix optical switches selecting one of a plurality of wavelength division multiplexing lights branched from each of the plurality of the optical branching devices to output the wavelength division multiplexing light to one of the plurality of the variable filters, the wavelength division multiplexing lights respectively transmitted through the plurality of the optical fibers are respectively supplied to the plurality of the matrix optical switches and, therefore, the matrix optical switches can select and supply to the variable filter a wavelength division multiplexing light including a wavelength to be dropped.

According to the third aspect of the invention, since the variable filter includes (1) a waveband separator separating the wavelength division multiplexing light into a plurality of wavebands, (2) a waveband selector selecting one waveband from a plurality of wavebands separated by the waveband separator, (3) a wavelength separator separating one waveband selected by the waveband selector into wavelengths, and (4) a drop wavelength selector selecting and dropping one wavelength from a plurality of the wavelengths separated by the wavelength separator to one of a plurality of receivers included in the electric layer, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the colorless, directionless, and contentionless function can be implemented by combining compact optical switches, thereby significantly reducing the scale of the terminating apparatus.

According to the fourth aspect of the invention, since the wavelength division multiplexing light is a sequentially-arranged waveband in which wavelengths making up each of a plurality of wavebands which constitute the wavelength division multiplexing lights are sequentially selected such that one band is made up of a plurality of wavelengths having lengths continuous to each other out of a plurality of wavelengths sequentially arranged in order of length of wavelength, a predetermined wavelength included in the sequentially-arranged waveband can be dropped.

According to the fifth aspect of the invention, since the wavelength division multiplexing light is a dispersively-arranged waveband in which wavelengths of a plurality of bands respectively making up a plurality of wavebands which constitute the wavelength division multiplexing lights are sequentially selected such that one band is made up of a plurality of wavelengths having lengths discontinuous to each other (uneven wavelength channel) out of a plurality of wavelengths sequentially arranged in order of length of wavelength, a predetermined wavelength included in the dispersively-arranged waveband can be dropped.

According to the sixth aspect of the invention, the optical signal terminating apparatus has an add-side variable filter selecting optical signals of wavelength paths added from the electric layer to combine the selected wavelengths into wavebands and an add-side branching apparatus combining the combined wavebands into wavelength division multiplexing light to transfer the wavelength division multiplexing light to an optical fiber. Therefore, a plurality of wavelength channels is selected from the added wavelength, the plurality of the wavelength channels is combined to make up wavebands, and a plurality of such wavebands is combined to make up each wavelength division multiplexing light; therefore, the selectors for the waveband selection and the wavelength selection can be formed by combining compact optical switches to implement the colorless, directionless, and contentionless function, thereby significantly reducing the scale of the terminating apparatus.

MODES FOR CARRYING OUT THE INVENTION

First Embodiment

Figure 1:
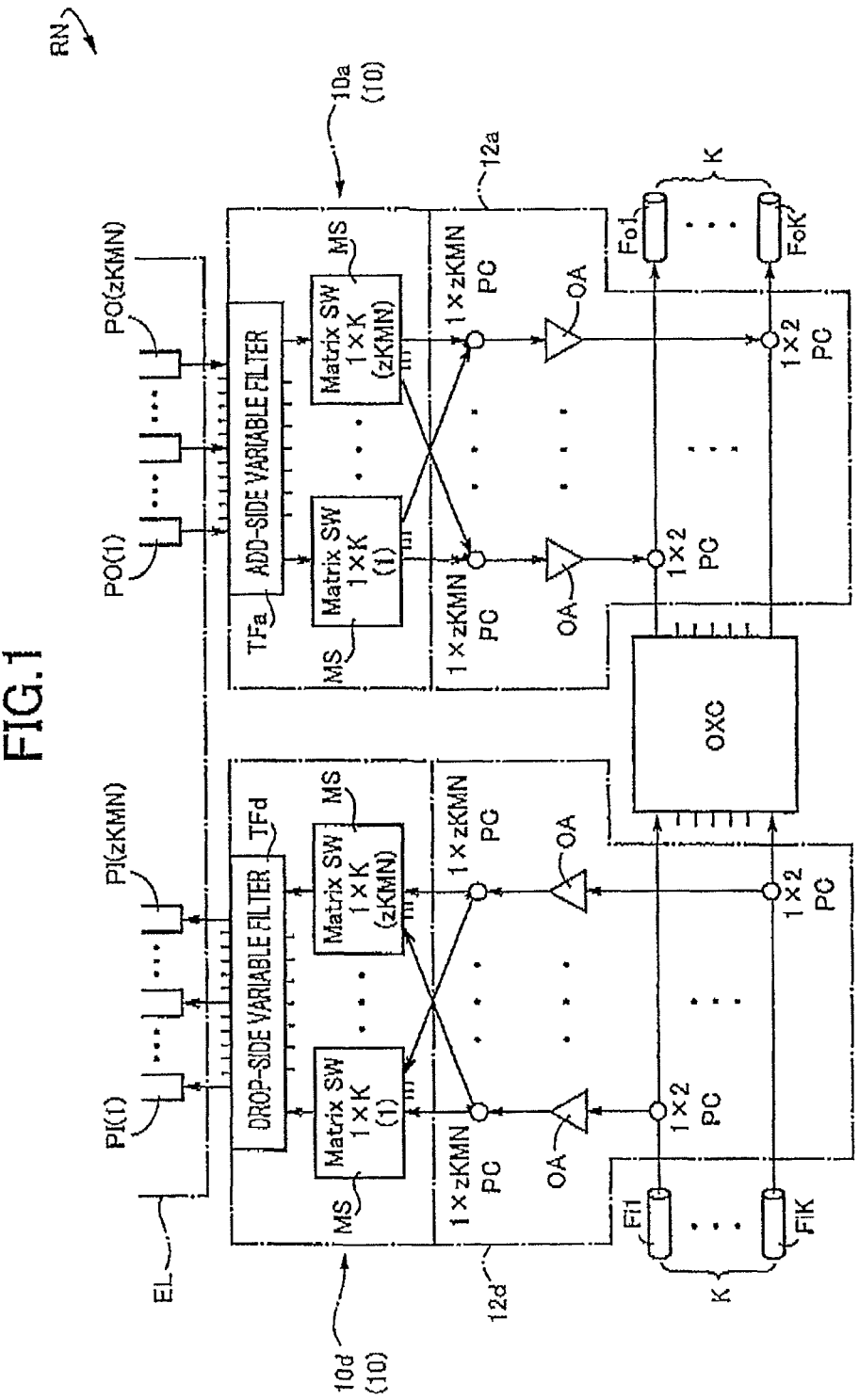
FIG. 1 is a schematic explaining a major configuration of a relay node for an optical path network including an optical signal terminating apparatus that is one embodiment of present invention.

FIG. 1 is a schematic of a main portion of a configuration of a relay node RN for an optical path network connected in a netlike manner through an optical fiber bundle made up of a plurality of, for example, K, optical fibers F1 to FK. This relay node RN is disposed between K input-side optical fibers Fi1, Fi2, . . . FiK acting as waveband paths and K output-side optical fibers Fo1, Fo2, . . . FoK and includes an optical path cross-connect apparatus OXC and an optical signal terminating apparatus 10.

In this embodiment, one waveband WB is formed by combining lights of a plurality of, i.e., N, wavelengths respectively corresponding to a plurality of wavelength channels (wave channels or light paths) divided by, for example, 100 GHz in a predetermined communication wavelength range, and M (M sets of) wavebands WB are combined to form one wavelength division multiplexing (WDM) light, which is transmitted through each optical fiber. Therefore, wavebands WB11 to WB1M, WB21 to WB2M, . . . WBK1 to WBKM are input in parallel via respective input-side optical fibers Fi1, Fi2, . . . FiK acting as optical fibers, and new routed wavebands WB11 to WB1M, WB21 to WB2M, . . . WBK1 to WBKM are output in parallel via respective output-side optical fibers Fo1, Fo2, . . . FoK acting as routes of optical paths. K, M, and N are integers and are set to K=8, M=8, and N=12, for example.

Figure 2:
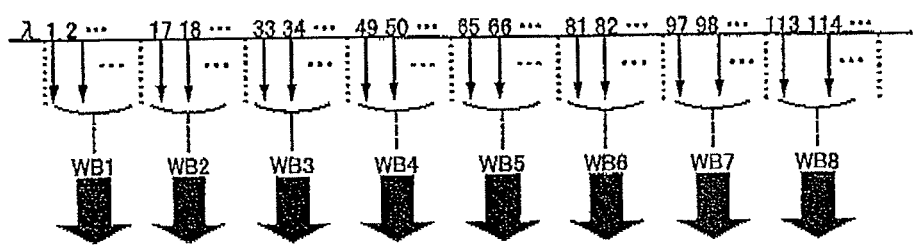
FIG. 2 is a diagram explaining a configuration of a sequentially-arranged type of wavelength division multiplexing lights transmitted in the optical path network of FIG. 1.
Figure 3:
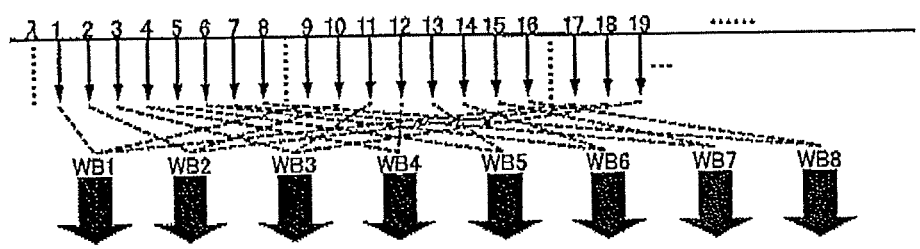
FIG. 3 is a schematic explaining a major configuration of a dispersively-arranged type of the wavelength division multiplexing lights transmitted in the optical path network of FIG. 1.

For example, wavelengths of wavelength channels included in the waveband WB11 are denoted by λ111 to λ11N; wavelengths of wavelength channels included in the waveband WB12 are denoted by λ121 to λ12N; wavelengths of wavelength channels included in the waveband WB1M are denoted by λ1M1 to λ1MN; wavelengths of wavelength channels included in the waveband WBKM are denoted by λKM1 to λKMN; and these wavelengths, for example, λ121 to λ12N may be wavelengths sequentially increasing in series or may be dispersive wavelengths. FIGS. 2 and 3 depict configuration examples of wavelengths λ making up the wavebands. FIG. 2 depicts an example of sequentially-arranged wavebands and a plurality of serially selected wavebands is set such that one band is made up of 16 consecutive wavelengths selected from consecutive wavelengths. FIG. 3 depicts an example of dispersively-arranged wavebands and, since one waveband is set as 16 wavelengths dispersively selected from consecutive wavelengths, one band is made up of wavelengths discontinuously different in a waveband and between the wavebands such that wavelengths making up a waveband are made up of wavelengths discontinuously different in the waveband and between the wavebands.

Figure 4:
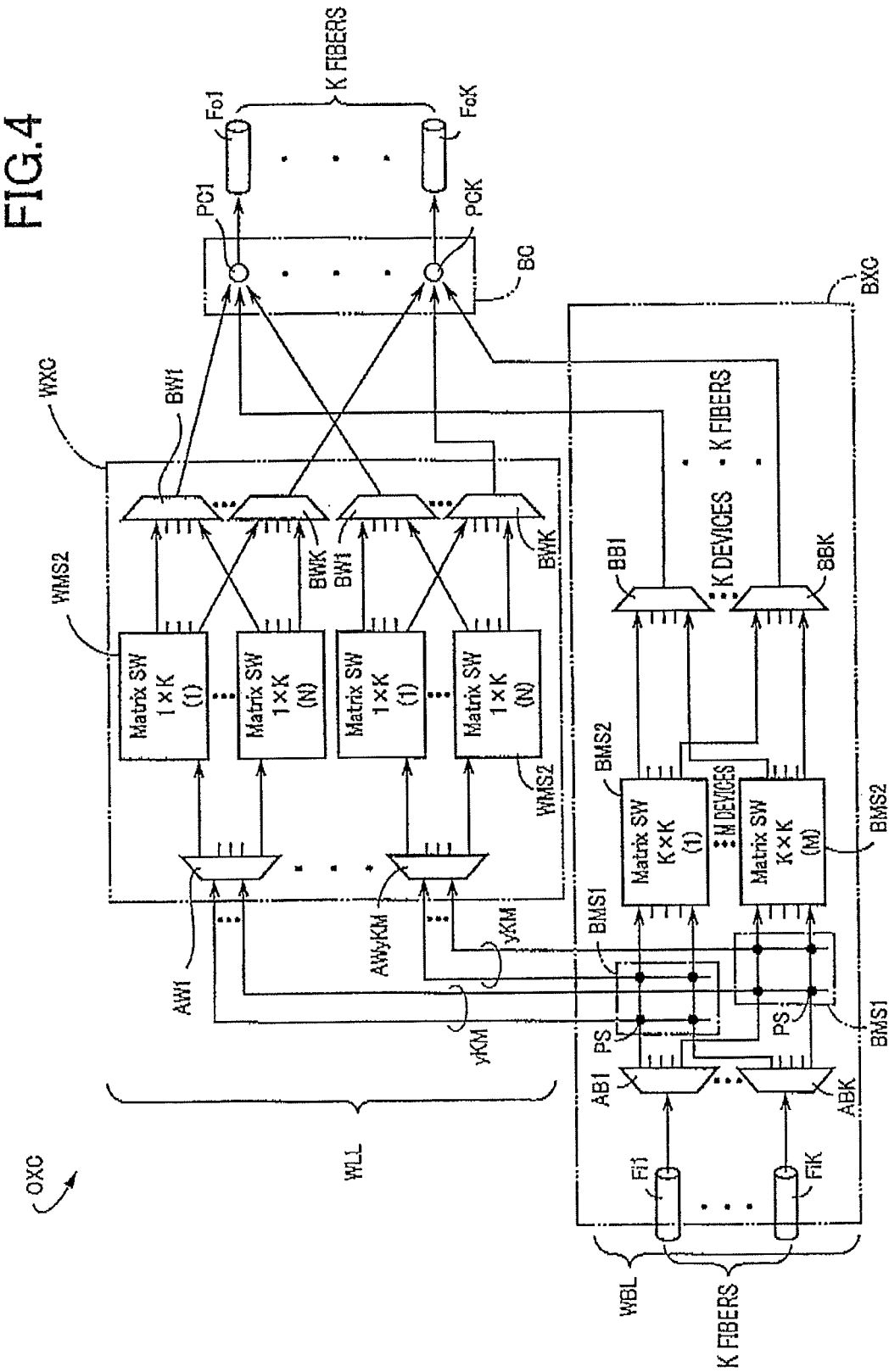
FIG. 4 is a diagram explaining a configuration example of an optical path cross-connect apparatus included in the relay node of FIG. 1.

The optical path cross-connect apparatus OXC extracts a predetermined wavelength included in wavelength division multiplexing lights respectively input via the K input-side optical fibers Fi1, Fi2, . . . FiK and incorporates the wavelength into another desired wavelength division multiplexing light for transmission via a desired fiber. This optical path cross-connect apparatus OXC is, for example, a layered optical path cross-connect apparatus depicted in FIG. 4 performing routing (route switching) on the basis of a waveband on a waveband level WBL and performing routing (route switching) on the basis of a wavelength on a wavelength level WLL. This optical path cross-connect apparatus OXC includes a waveband path cross-connect portion BXC performing the waveband-based routing of the wavelength division multiplexing lights respectively input via the K input-side optical fibers Fi1, Fi2, . . . FiK, i.e., the K (K sets of) wavebands WB11 to WB1M, WB21 to WB2M, . . . WBK1 to WBKM so that each set is output to one of the K output-side optical fibers Fo1, Fo2, . . . FoK while dropping a predetermined number, i.e., a preset add/drop rate y (arbitrary number from 0 to 1), of drop wavebands out of the K input wavebands WB11 to WB1M, WB21 to WB2M, . . . WBK1 to WBKM to a wavelength path cross-connect portion WXC; the wavelength path cross-connect portion WXC performing the wavelength-based routing of a plurality of wavelengths making up each of the predetermined-rate wavebands dropped at the preset add/drop rate y (arbitrary number from 0 to 1) to form and output a predetermined rate of added waveband; and a waveband combiner BC combining the K wavebands having the routes switched by the waveband path cross-connect portion BXC and respectively output to the K output-side optical fibers Fo1, Fo2, . . . FoK with the added wavebands rearranged by the wavelength path cross-connect portion WXC so that the combined wavebands are respectively input to the K output-side optical fibers Fo1, Fo2, . . . FoK. The optical path cross-connect apparatus OXC may be a single-layer optical path cross-connect apparatus instead of the layered optical path cross-connect apparatus configuration as described above.

The optical signal terminating apparatus 10 includes a drop-side optical signal terminating apparatus 10$d$ selecting a predetermined (arbitrary) drop wavelength from the wavelength division multiplexing lights respectively input via the K input-side optical fibers Fi1, Fi2, . . . FiK acting as optical fibers, i.e., the K (K sets of) wavebands WB11 to WB1M, WB21 to WB2M, . . . WBK1 to WBKM so as to drop the drop wavelength to a predetermined (arbitrary) receiver out of a plurality of receivers PI in the electric layer EL disposed with a router etc., for signal conversion between electric signals and wavelength-based optical signals; and an add-side optical signal terminating apparatus 10$a$ adding an optical signal added from a predetermined (arbitrary) transmitter out of a plurality of transmitters PO in the electric layer EL, i.e., an add wavelength, to a predetermined waveband in need thereof and further adding the predetermined waveband to a predetermined wavelength division multiplexing signal in need thereof such that the predetermined waveband is transmitted from any one of the output-side optical fibers Fo1, Fo2, . . . FoK transmitting the predetermined wavelength division multiplexing signal.

Returning to FIG. 1, the drop-side optical signal terminating apparatus 10$d$ and the add-side optical signal terminating apparatus 10$a$ are made up of optical components having a reversible property in both directions of input/output almost in the same way except that the direction of light is different. For example, even when those referred to as a wave separator on one side are referred to as a wave combiner on the other side, these optical components have the same configuration. Therefore, in the following description, the configuration of the add-side optical signal terminating apparatus 10$a$ will not be described because the configuration of the drop-side optical signal terminating apparatus 10$d$ will be described instead. An add-side variable filter TFa of the add-side optical signal terminating apparatus 10$a$ may not be included in some configurations depending on characteristics of an add-side light source.

The drop-side optical signal terminating apparatus 10$d$ includes an optical branching apparatus (device) 12$d$ branching each of K wavelength division multiplexing signals respectively transmitted via the K input-side optical fibers Fi1, Fi2, . . . FiK connected on the input side of the optical path cross-connect apparatus OXC into the number zKMN acquired by multiplying a total wavelength channel number KMN by an add/drop rate z to the electric layer EL; zKMN 1-by-K matrix optical switches MS respectively receiving the K wavelength division multiplexing signals respectively branched from the fibers by the optical branching apparatus 12$d$ and selecting one wavelength division multiplexing signal including a wavelength desired to be dropped; and a variable filter TFd selecting a drop wavelength desired to be dropped from the wavelength division multiplexing signals selected by the zKMN 1-by-K matrix optical switches MS so as to output a desired wavelength transmitted through a desired input fiber to a desired receiver out of zKMN receivers PI disposed on the electric layer EL.

The optical branching apparatus 12$d$ includes K 1-by-2 photocouplers PC disposed on the input-side optical fibers Fi1, Fi2, . . . FiK; K optical amplifiers OA amplifying respective wavelength division multiplexing signals branched by the 1-by-2 photocouplers PC; and 1-by-zKMN photocouplers PC respectively branching the wavelength division multiplexing lights amplified by the optical amplifiers OA to the zKMN 1-by-K matrix optical switches MS. The 1-by-zKMN photocouplers PC may be formed by connecting photocouplers PC having a smaller branch number on multiple stages. The branching function of the photocouplers PC may be achieved by WSS (wavelength selection switches) or VBF (variable wavelength filters). The optical amplifiers OA may be made up of optical fiber amplifiers or semiconductor optical amplifiers SOA, for example, and may not necessarily be disposed.

Figure 5:
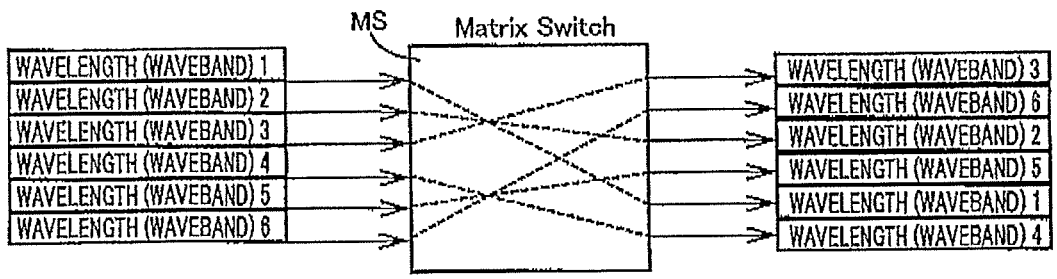
FIG. 5 is a diagram explaining a configuration and a function of a matrix optical switch used in the relay node of FIG. 1.
Figure 6:
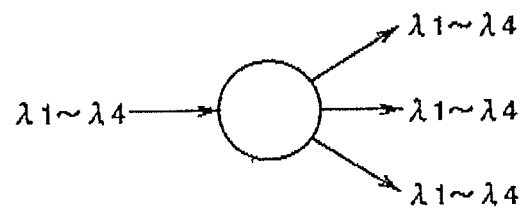
FIG. 6 is a diagram explaining a configuration and a function of 1-by-3 photocouplers PC used in the relay node of FIG. 1.
Figure 7:
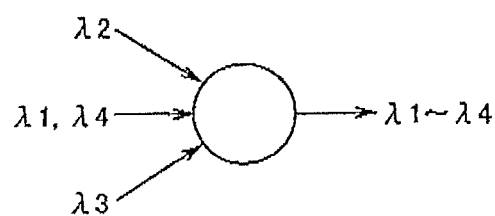
FIG. 7 is a diagram explaining a configuration and a function of 3-by-1 photocouplers PC used in the relay node of FIG. 1.

Devices used in this embodiment will be described. The matrix optical switch MS outputs wavebands or wavelength-based optical signals respectively input to a plurality of input ports, from a plurality of respective output ports in an arbitrary arrangement sequence as depicted in FIG. 5, for example, and is a matrix optical switch having optical paths between a plurality of input fibers and a plurality of output fibers selectively formed by a collimator lens and one-axis or two-axis movable micromirrors (MEMS mirrors) by utilizing the MEMS technology or a matrix optical switch made up of glass waveguides and MZI (Mach-Zehnder interferometer) by utilizing the PLC (Planar Lightwave Circuit) technology. This matrix optical switch MS becomes complicated in structure and expensive in proportion to the product of the input port number and the output port number. The photocoupler PC is formed by melting and bonding portions of cores of a plurality of optical fibers to each other, for example, and when the photocoupler PC has a plurality of output ports for one input port as depicted in FIG. 6, a waveband $\lambda1$ to $\lambda4$ is directly output from a plurality of the output ports and the optical signal intensity is reduced by a factor of the number of the output ports. When the photocoupler PC has one output port for a plurality of input ports as depicted in FIG. 7, if wavelengths $\lambda2$, $\lambda1$ and $\lambda4$, and $\lambda3$ are separately input, the wavelengths $\lambda1$ to $\lambda4$ of all the input optical signals are output from one output port and the optical signal intensity of each wavelength is obtained by dividing the input signal intensity by the input port numbers. The photocoupler PC configured as described above has cost reduced by a factor of a few hundred as compared to the matrix optical switch MS.

Figure 8:
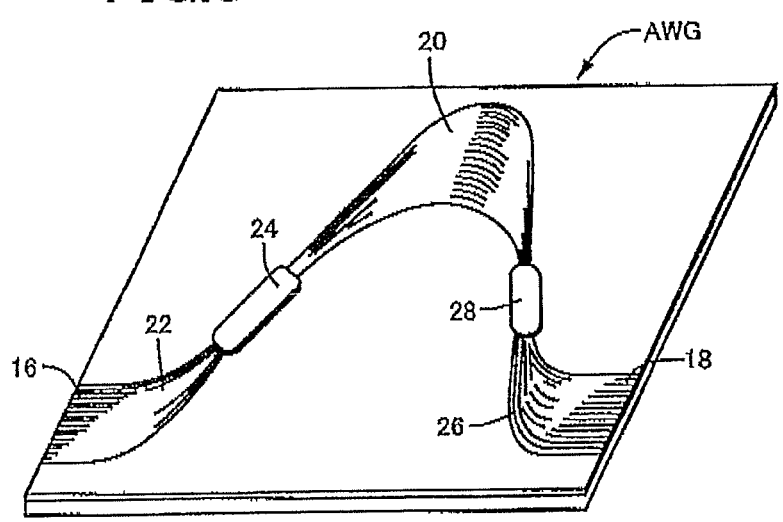
FIG. 8 is a diagram explaining a configuration and a function of an arrayed waveguide grating AWG used in the relay node of FIG. 1.

The arrayed waveguide grating AWG is well-known as depicted in FIG. 8, for example, and includes a plurality of arrayed waveguides 20 having a difference in optical path length from each other; a plurality of input-side waveguides 22 having respective input ports 16; an input lens waveguide 24 disposed between the input-side waveguides 22 and the arrayed waveguides 20 and distributing the wavelength division multiplexing lights WDM input to the input ports 16 in a diffused manner such that the wavelength division multiplexing lights WDM are input to respective input-side end portions of a plurality of the arrayed waveguides 20; a plurality of output-side waveguides 26 respectively connected to optical connecting channels 18; and an output lens waveguide 28 disposed between the output-side waveguides 26 and the arrayed waveguides 20 and individually dispersing a plurality of wavelength channels included in the wavelength division multiplexing lights WDM output from the output-side end portions of a plurality of the arrayed waveguides 20 (e.g., a plurality of optical signals having wavelengths different from each other with center wavelength positions differentiated by 100 GHz) on the basis of a wavelength through diffraction based on mutual difference in optical path length of a plurality of the arrayed waveguides 20 and collecting the wavelength channels to end portions of the output-side waveguides 26 so that the wavelength channels are separated for the respective preset output-side waveguides 26 to combine and output the lights collected to an end portion of each of the output-side waveguides 26 through different wave separations.

The arrayed waveguide grating AWG generally has the arrayed waveguides 20 and the output lens waveguide 28 set such that a plurality of wavebands (wavelength division multiplexing light) WB transmitted through a common optical fiber (waveband path) is separated on the basis of a waveband with sufficient signal intensity, and the other arrayed waveguide grating AWG2 has the arrayed waveguides 20 and the output lens waveguide 28 designed to have sufficient resolution such that the utilized wavelength channels λ1 to λMN are individually separated with sufficient signal intensity. The arrayed waveguide grating AWG has the capability of separating and combining the wavelength division multiplexing light WDM at the wavelength resolution at least necessary for separating and combining each wavelength channels and has a wavelength separation function of separating a plurality of wavelength channels λ1 to λ16 included in the wavelength division multiplexing light WDM input to one input port for each wavelength and a property (function) in which, when a plurality of wavelength channels λ2 to λ17 included in the wavelength division multiplexing light WDM is input to an input port located at an input position shifted by one port in a plurality of input ports, the wavelength channels λ2 to λ17 are output such that the same wavelengths appear from output ports located at positions shifted one-by-one as depicted in FIG. 9.

Figure 9:
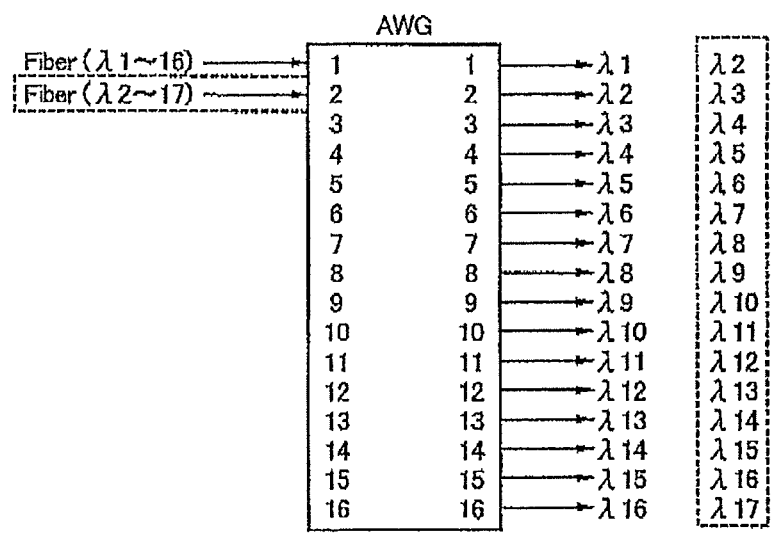
FIG. 9 is a diagram explaining a separating operation of the arrayed waveguide grating AWG of FIG. 8.
Figure 10:
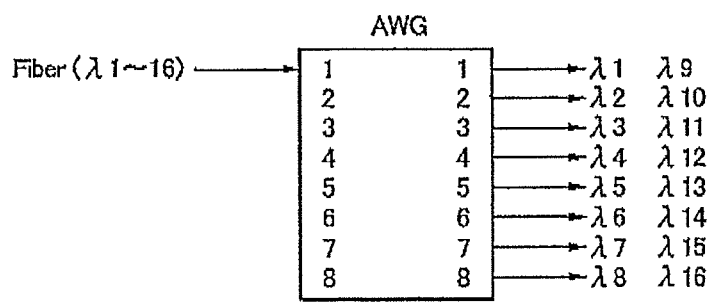
FIG. 10 is a diagram explaining a cyclic separating operation of the arrayed waveguide grating AWG of FIG. 8.

In the case of the 16-by-16 arrayed waveguide grating AWG of FIG. 9, when a waveband λ1 to λ16 is input to an input port 1, the wavelengths are separated and the wavelengths λ1 to λ16 are output from 16 output ports in parallel. Conversely, when the wavelengths λ1 to λ16 are input to the 16 output ports in parallel, the wavelengths are combined and the waveband λ1 to λ16 is output from the input port. When a waveband λ2 to λ17 is input to an input port 2, the wavelengths are separated and the wavelengths λ2 to λ17 are output from the 16 output ports in parallel. Conversely, when the wavelengths λ2 to λ17 are input to the 16 output ports in parallel, the wavelengths are combined and a waveband λ2 to λ17 is output from the input port. In the case of a 8-by-8 cyclic arrayed waveguide grating AWG of FIG. 10 having the number of output ports smaller than the number of wavelengths, when a waveband λ1 to λ16 is input to an input port 1, the wavelengths are separated and the wavelengths λ1 to λ8 are output from 8 output ports 1 to 8 in parallel while the remaining wavelengths are circulated to the output port 1 and the wavelengths λ9 to λ16 are output in parallel.

Figure 11:
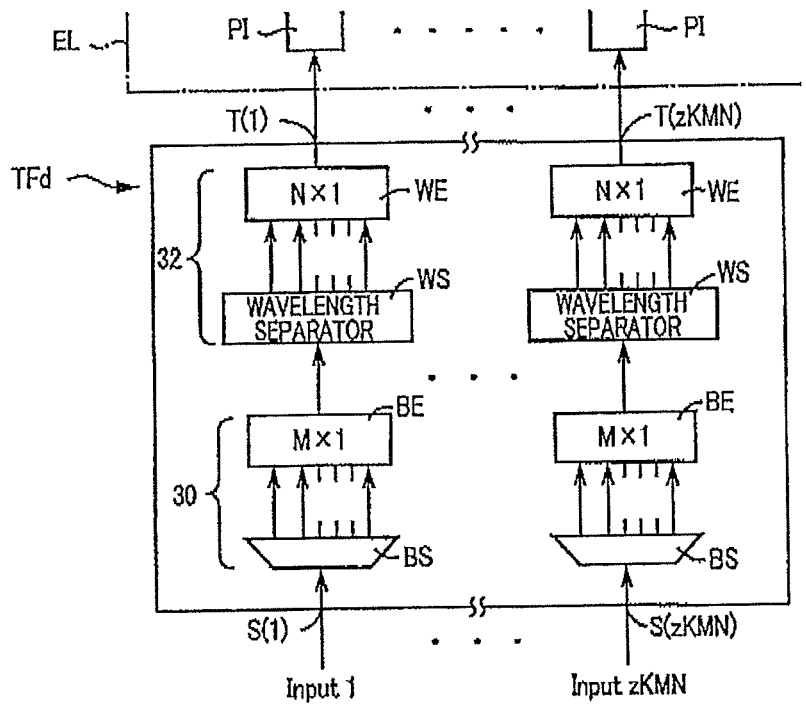
FIG. 11 is a diagram explaining a major configuration of a variable filter included in a drop-side optical terminating apparatus in the relay node of FIG. 1.

FIG. 11 depicts an exemplary configuration of the variable filter TFd. The variable filter TFa of the add-side terminating apparatus 10a is made up of an optical component having a reversible property in both directions of input/output in the same way except that the direction of light is different. In the following description, the configuration of the add-side variable filter TFa will not be described because the configuration of the drop-side variable filter TFd will be described instead.

In FIG. 11, the variable filter TFd includes zKMN input ports S for inputting wavelength division multiplexing lights from the zKMN 1-by-K matrix optical switches MS; zKMN output ports T for outputting drop wavelengths to zKMN receivers PI disposed on the electric layer EL; and waveband separating/selecting devices 30 and a wavelength separating/selecting devices 32 respectively interposed in series between pairs of the input ports S and the output ports T, the waveband separating/selecting devices 30 separating a plurality of wavebands from wavelength division multiplexing light and separating and selecting a waveband including a drop wavelength from the separated wavebands, the wavelength separating/selecting devices 32 separating wavelengths from the waveband and selecting the drop wavelength from the separated wavelengths.

The waveband separating/selecting device 30 is made up of a waveband separator BS separating a plurality of wavebands making up the wavelength division multiplexing light branched from one input-side optical fiber selected by the 1-by-K matrix optical switch MS from the input-side optical fibers Fi1, Fi2, ... FiK, and a waveband selector BE selecting one waveband including a drop wavelength from a plurality of the wavebands separated by the waveband separator BS. The wavelength separating/selecting device 32 is made up of a wavelength separator WS separating wavelengths making up one waveband selected by the waveband selector BE, and a wavelength selector WE selecting one drop wavelength from a plurality of the wavelengths separated by the wavelength separator WS and dropping the drop wavelength to one of a plurality of the receivers PI included in the electric layer EL.

Figure 12:
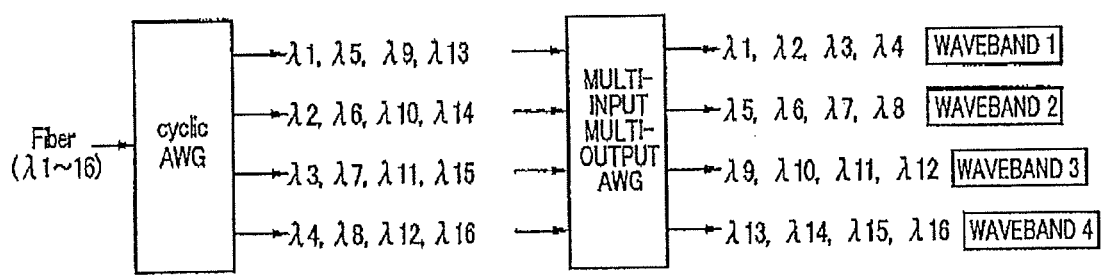
FIG. 12 is a diagram explaining a cyclic arrayed waveguide grating and multi-input multi-output arrayed waveguide grating in which making up a waveband separator BS and connected to each other in the variable filter of FIG. 11.

The waveband separator BS is made up of a cyclic 1-by-N (4) arrayed waveguide grating (AWG) and N (4)-by-M (4) multi-input multi-output arrayed waveguide grating (AWG) depicted in FIG. 12, for example. The multi-input multi-output arrayed waveguide grating hereinafter refers to a wave combiner/separator capable of receiving input of different wavebands to different ports and outputting wavelengths separated into sets corresponding common ports independently of waveband numbers. In an example depicted in FIG. 12, when sequentially-arranged wavelength division multiplexing light having λ1 to λ16 is input in the case of N=4 and M=4, the cyclic arrayed waveguide grating separates the wavelength division multiplexing light into dispersively-arranged wavebands, and the multi-input multi-output arrayed waveguide grating converts the dispersively-arranged wavebands into sequentially-arranged wavebands so that the wavelength division multiplexing light is separated into a waveband 1 of λ1 to λ4, a waveband 2 of λ5 to λ8, a waveband 3 of λ9 to λ12, and a waveband 4 of λ13 to λ16.

Figure 13:
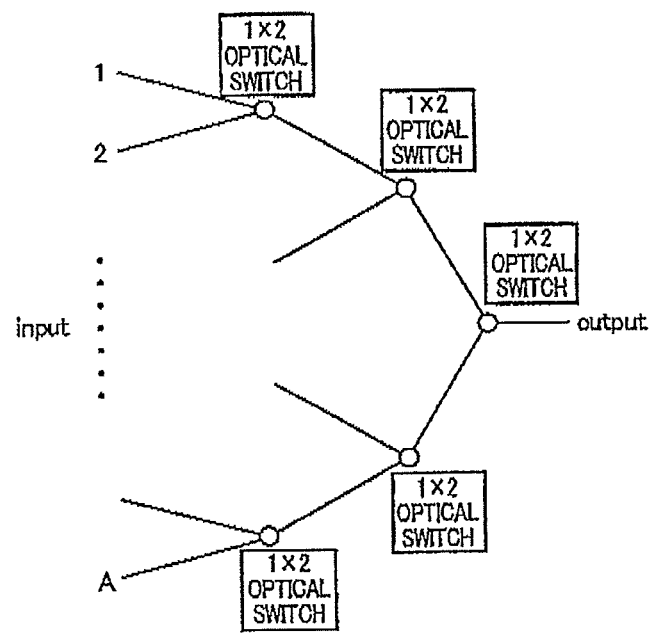
FIG. 13 is a diagram of an A-by-1 optical switch connected in a tree-type that is making up each of a waveband selector BE and a wavelength selector WE in the variable filter of FIG. 11.

Each of the waveband selector BE and the wavelength selector WE is made up of a tree-type A-by-1 (4-by-1) optical switch depicted in FIG. 13, for example. This tree-type 4-by-1 optical switch is formed by connecting a plurality of (in this embodiment, three) 1-by-2 optical switches in a tree shape and has a function of extracting one waveband or wavelength from four input wavebands or input wavelengths. This tree-type A-by-1 optical switch advantageously eliminates a difference in loss between output wavebands or wavelengths because the wavebands or wavelengths pass through the same number of 1-by-2 optical switches from input to output.

Figure 14:
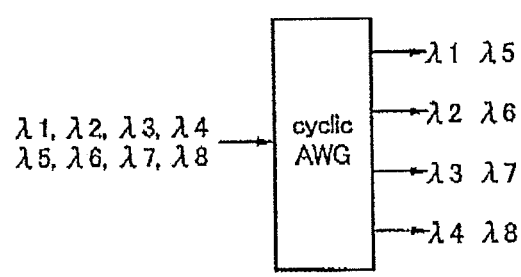
FIG. 14 is a diagram explaining a 1-by-4 cyclic arrayed waveguide grating that is making up a wavelength separator WS in the variable filter of FIG. 11.

The wavelength separator WS is made up of a cyclic arrayed waveguide grating (AWG) depicted in FIG. 14, for example. In an example depicted in FIG. 14, when one waveband, for example, the waveband 1 of λ1 to λ4 or the waveband 2 of λ5 to λ8 is input, the separated wavelengths λ1, λ2, λ3, and λ4 or λ5, λ6, λ7, and λ8 are respectively output from four output ports.

The drop-side optical signal terminating apparatus 10*d* configured as described above has functions depicted in FIG. 15. Specifically, the drop-side optical signal terminating apparatus 10*d* has the functions of selecting a fiber transmitting the wavelength division multiplexing light including an arbitrary drop wavelength from the K input-side optical fibers Fi1, Fi2, . . . FiK with the matrix optical switch MS, separating the wavelength division multiplexing light into a plurality of wavebands making up the wavelength division multiplexing light with the waveband separator BS, selecting one waveband including the drop wavelength from the plurality of the wavebands with the waveband selector BE, separating the one waveband into a plurality of wavelengths making up the one waveband with the wavelength separator WS, and selecting the drop wavelength from the plurality of the wavelengths with the wavelength separator WS.

According to the drop-side optical signal terminating apparatus 10*d* of this embodiment, when selecting an optical signal of a predetermined wavelength path (drop wavelength) making up any one of a plurality of wavebands included in one wavelength division multiplexing light selected from K wavelength division multiplexing lights respectively transmitted in parallel to the relay node RN via the K input-side optical fibers Fi1, Fi2, . . . FiK in an optical path network so as to drop the optical signal to the electric layer, the variable filter TFd separates a plurality of wavebands making up one wavelength division multiplexing light including the drop wavelength, selects one waveband including the drop wavelength from the plurality of the wavebands, separates a plurality of wavelengths making up the one selected waveband, and selects and drops the one drop wavelength from the separated wavelengths to one of a plurality of the receivers PI included in the electric layer EL. Therefore, after a predetermined wavelength division multiplexing light is separated into a plurality of wavebands which constitutes the predetermined wavelength division multiplexing light, a waveband including the drop wavelength is selected from the plurality of the wavebands; the one waveband is separated into a plurality of wavelength channels which constitutes the one waveband; the wavelength to be dropped is selected from the plurality of the wavelength channels; therefore, the selectors for the waveband selection and the wavelength selection can be formed by combining compact optical switches to implement the colorless, directionless, and contentionless function, thereby significantly reducing the scale of the optical signal terminating apparatus 10. These effects related to the drop-side variable filter TFd including those described later are also acquired from the add-side variable filter TFa.

In the relay node RN of this embodiment, since the drop-side optical signal terminating apparatus 10*d* includes (a) the optical branching device 12*d* branching each of the wavelength division multiplexing lights from the plurality of the optical fibers and (b) a plurality of the matrix optical switches MS selecting one of a plurality of wavelength division multiplexing lights branched from the optical branching device 12*d* to output the wavelength division multiplexing light to one of the plurality of the variable filters, the wavelength division multiplexing lights respectively transmitted through the plurality of the optical fibers are respectively supplied to the plurality of the matrix optical switches MS and, therefore, the matrix optical switches MS can select and supply to the variable filter TFd a wavelength division multiplexing light including a drop wavelength to be dropped.

In this embodiment, since the variable filter TFd includes (1) the waveband separator BS separating the wavelength division multiplexing light into a plurality of wavebands making up the wavelength division multiplexing light, (2) the waveband selector BE selecting one waveband from a plurality of the wavebands separated by the waveband separator BS, (3) the wavelength separator WS separating the one waveband selected by the waveband selector BE into wavelengths making up the one waveband, and (4) the wavelength selector WE selecting one wavelength from a plurality of the wavelengths separated by the wavelength separator WS and dropping the wavelength to one of a plurality of the receivers included in the electric layer EL, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the colorless, directionless, and contentionless function can be implemented by combining compact switches, thereby significantly reducing the scale of the optical signal terminating apparatus 10.

Other embodiments of the present invention will be described. In the following description, the portions common to the embodiments are denoted by the same reference numerals and will not be described.

Second Embodiment

Figure 16:
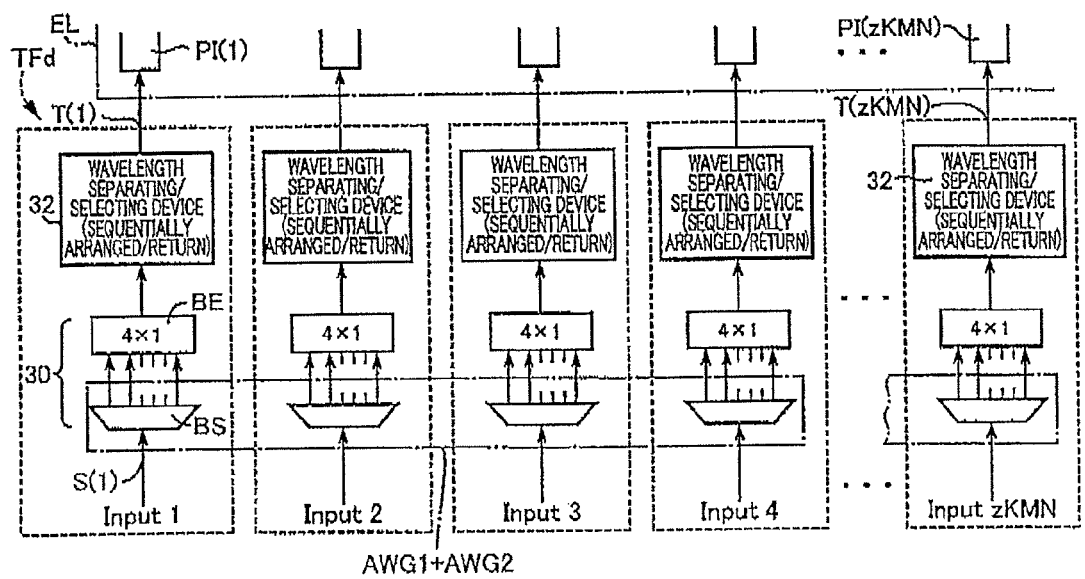
FIG. 16 is a schematic explaining a major configuration of a variable filter in another embodiment (second embodiment) of the present invention.

FIG. 16 depicts the variable filter TFd of another embodiment of the present invention. As is the case with the first embodiment depicted in FIG. 11, the waveband separating/selecting device 30 of the variable filter TFd is made up of the waveband separator BS separating the wavelength division multiplexing light into a plurality of wavebands making up the wavelength division multiplexing light branched from one input-side optical fiber selected by the 1-by-K matrix optical switch MS from the input-side optical fibers Fi1, Fi2, . . . FiK, and the waveband selector BE selecting one waveband including a drop wavelength from a plurality of the wavebands separated by the waveband separator BS. As is the case with the first embodiment depicted in FIG. 11, the wavelength separating/selecting device 32 of the variable filter TFd acts as the wavelength separator WS separating the one waveband selected by the waveband selector BE into wavelengths making up the one waveband, and the wavelength selector WE selecting one drop wavelength from a plurality of the wavelengths separated by the wavelength separator WS and dropping the drop wavelength to one of a plurality of the receivers PI included in the electric layer EL.

Figure 17:
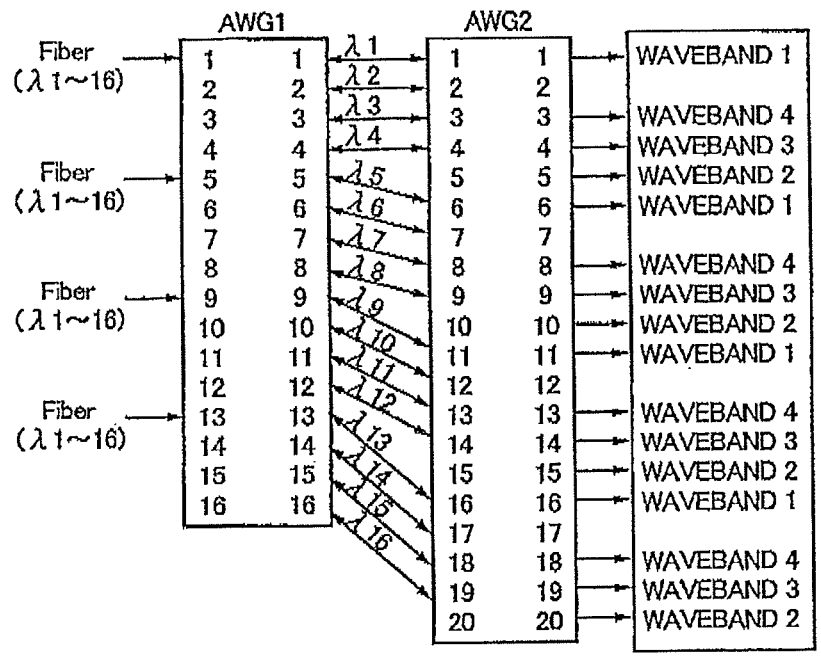
FIG. 17 is a diagram explaining an arrayed waveguide grating AWG1 and an arrayed waveguide grating AWG2 in which making up a waveband separator BS and connected to each other in the variable filter of FIG. 16.

The waveband separator BS is made up of an arrayed waveguide grating AWG1 and an arrayed waveguide grating AWG2 depicted in FIG. 17, for example. When sequentially-arranged wavelength division multiplexing light having λ1 to λ16 is input to the input ports 1, 5, 9, and 13 of the arrayed waveguide grating AWG1 in parallel in the case of N=4 and M=4, the wavelengths λ1 to λ16 are respectively output from the output ports 1 to 16 of the arrayed waveguide grating AWG1 and, when λ1 to λ4, λ5 to λ8, λ9 to λ12, and λ13 to λ16 of the wavelengths are input to the input ports 1 to 4, 6 to 9, 11 to 14, and 16 to 19 of the arrayed waveguide grating AWG2, the waveband 1, the waveband 2, the waveband 3, and the waveband 4 are output from the output ports 1, 6, 11, and 16, the output ports 5, 10, 15, and 20, the output ports 4, 9, 14, and 19, and the output ports 3, 8, 13, and 18, respectively, of the arrayed waveguide grating AWG2. In this case, for example, a plurality of (B, e.g., four) the waveband separators BS can be made up of one integrated device and, therefore, a plurality of fibers can be connected to one device, which advantageously achieves smaller size and lower cost.

Figure 18:
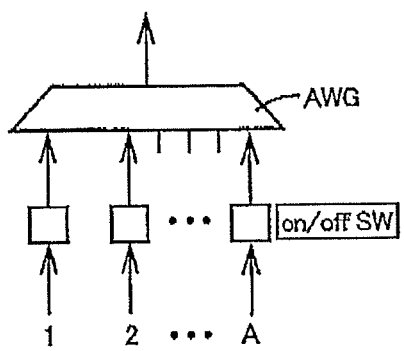
FIG. 18 is a diagram explaining an A-by-1 arrayed waveguide grating that is making up the waveband selector BE in the variable filter of FIG. 16.

Each of the waveband selectors BE is made up of an AWG type A-by-1 (e.g., A=N) switch depicted in FIG. 18, for example. The AWG type A-by-1 switch is made up of an arrayed waveguide grating AWG acting as an A-by-1 wave combiner and A on/off optical switches respectively disposed on A input fibers, and has a function of blocking unnecessary input out of the A input wavebands with the on/off optical switches.

Figure 19:
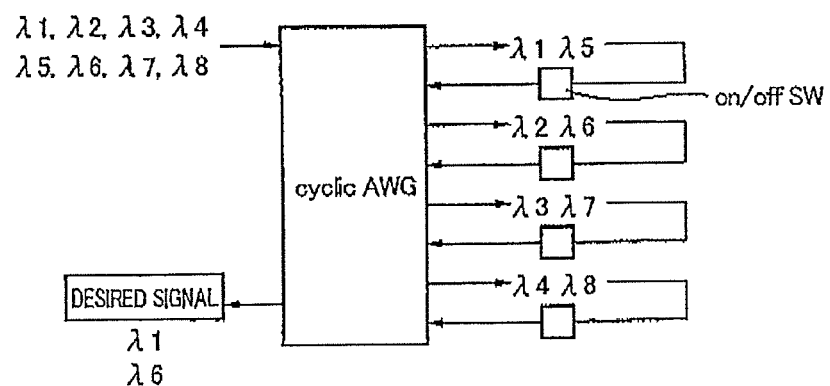
FIG. 19 is a diagram explaining a turned-type 2-by-8 cyclic arrayed waveguide grating that is making up a wavelength selecting device in the variable filter of FIG. 16.

The wavelength separating/selecting device 32 is made up of a cyclic arrayed waveguide grating (AWG) depicted in FIG. 19, for example, and four on/off switches disposed on the output side of the cyclic arrayed waveguide grating. In FIG. 19, the cyclic arrayed waveguide grating is configured on the assumption of 50 GHz, i.e., a half interval of the wavelength interval (100 GHz) of wavelength channels. When one sequentially-arranged waveband having an interval of 100 GHz, for example, the waveband 1 of λ1 to λ4 or the waveband 2 of λ5 to λ8 is input to one input port of the cyclic arrayed waveguide grating, the wavelengths λ1, λ2, λ3, and λ4 or the wavelengths λ5, λ6, λ7, and λ8 subjected to the wavelength separation are respectively output from four output ports and the four on/off optical switches are respectively disposed on paths inputting the wavelengths λ1, λ2, λ3, and λ4 or the wavelengths λ5, λ6, λ7, and λ8 again from the four output ports to four other output ports. In this case, when the on/off switch disposed on the path inputting the wavelength λ1 again on the output side is opened, the wavelength λ1 is output from a predetermined input port and when the on/off optical switch disposed on the path inputting the wavelength λ6 again on the output side is opened, the wavelength λ6 is output from the predetermined input port as depicted in the example.

Figure 15:
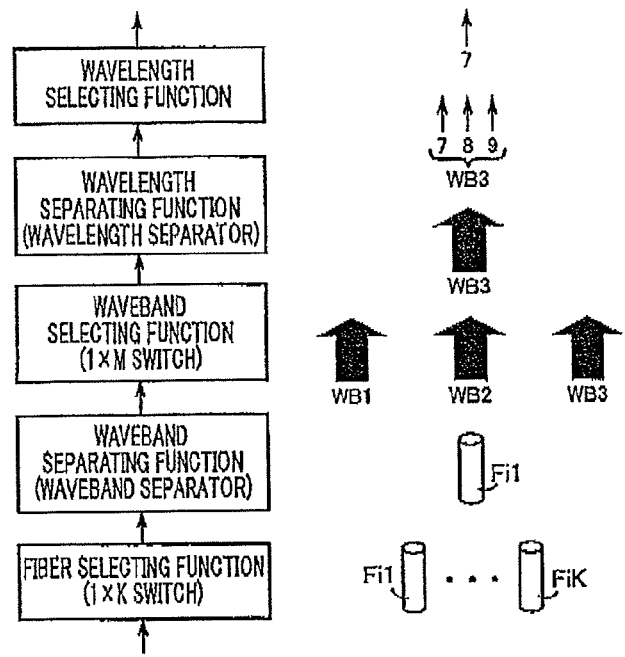
FIG. 15 is a flowchart explaining functions of the variable filter in the first embodiment of FIG. 11.

The drop-side optical signal terminating apparatus 10d of this embodiment has the same functions as those depicted in FIG. 15 of the first embodiment and, therefore, the same effects as the first embodiment are acquired.

Third Embodiment

Figure 20:
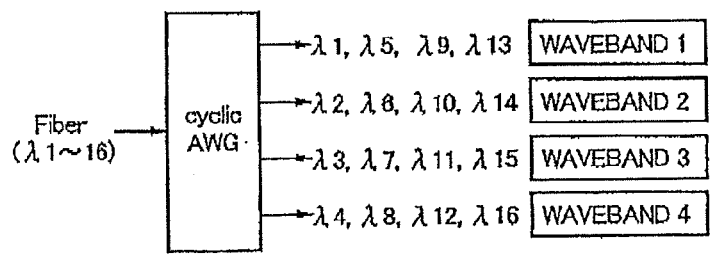
FIG. 20 is a diagram explaining a 1-by-4 cyclic arrayed waveguide grating that is making up the waveband separator BS in a variable filter of another embodiment (third embodiment) of the present invention.
Figure 21:
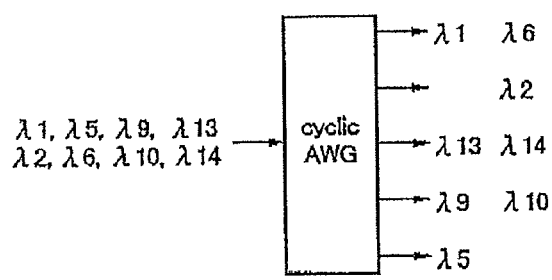
FIG. 21 is a diagram explaining a 1-by-5 cyclic arrayed waveguide grating that is making up the wavelength separator WS in the variable filter of the third embodiment.

The variable filter TFd of this embodiment is the same as the variable filter of the drop-side optical signal terminating apparatus 10d of the first embodiment depicted in FIG. 11 except that the waveband separator BS and the wavelength separator WS are different. The waveband separator BS of this embodiment is made up of a 1-by-M (4) cyclic arrayed waveguide grating (AWG) as depicted in FIG. 20. When sequentially-arranged wavelength division multiplexing light having λ1 to λ16 is input to one input port in the case of N=4 and M=4, the cyclic arrayed waveguide grating separates the wavelength division multiplexing light into dispersively-arranged wavebands, which are a waveband 1 of λ1, λ5, λ9, and λ13; a waveband 2 of λ2, λ6, λ10, and λ14; a waveband 3 of λ3, λ7, λ11, and λ15; and a waveband 4 of λ4, λ8, λ12, and λ16. The wavelength separator WS of this embodiment is made up of a cyclic arrayed waveguide grating (AWG) as depicted in FIG. 21. For example, when the waveband 1 or the waveband 2 is input, the waveband is separated on the basis of a wavelength, and λ1, λ5, λ9, and λ13 or λ2, λ6, λ10, and λ14 making up the waveband 1 or the waveband 2 are respectively output from output ports. Since the waveband separator BS and the wavelength separator WS of this embodiment perform the separation based on a waveband and the separation based on a wavelength, the effects same as the first embodiment are acquired.

Fourth Embodiment

Figure 22:
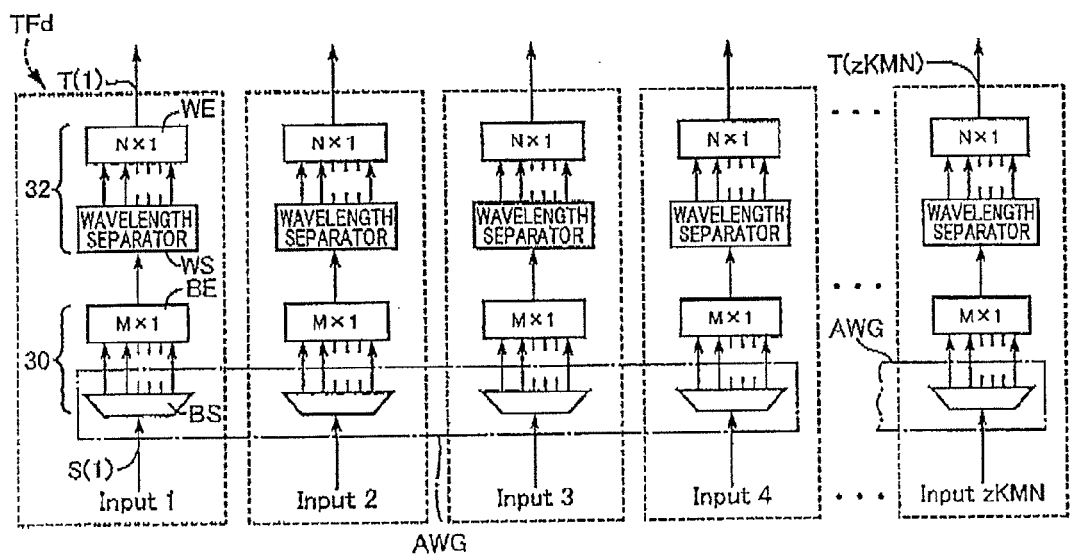
FIG. 22 is a schematic explaining a major configuration of a variable filter in another embodiment (fourth embodiment) of the present invention.
Figure 23:
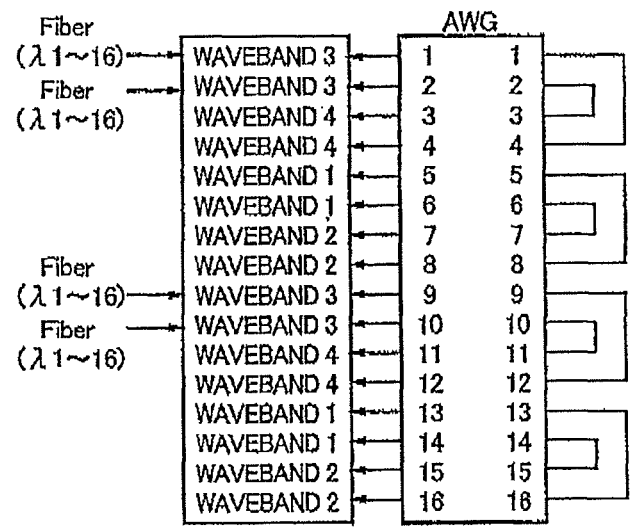
FIG. 23 is a diagram explaining a configuration of an arrayed waveguide grating with a 16-by-16 turned waveguide that is making up the waveband separator BS in the variable filter of FIG. 22.

The variable filter TFd of this embodiment depicted in FIG. 22 is the same as the variable filter of the drop-side optical signal terminating apparatus 10d described in the third embodiment except that the waveband separator BS is different. As depicted in FIG. 23, the waveband separator BS of this embodiment is made up of an arrayed waveguide grating AWG including 16 input ports and 16 output ports such that the output ports 1, 2, 5, 6, 9, 10, 13, and 14 are mutually connected to the output ports 4, 3, 8, 7, 12, 11, 16, and 15, respectively, so as to return the output signals. When sequentially-arranged wavelength division multiplexing light λ1 to λ16 is input to the input ports 1, 2, 9, and 10, a dispersively-arranged waveband 1 of λ1, λ5, λ9, and λ13 is output from the input ports 5, 6, 13, and 14; a waveband 2 of λ2, λ6, λ10, and λ14 is output from the input ports 7, 8, 15, and 16; a waveband 3 of λ3, λ7, λ11, and λ15 is output from the input ports 1, 2, 9, and 10; and a waveband 4 of λ4, λ8, λ12, and λ16 is output from the input ports 3, 4, 11, and 12. One waveband including a drop wavelength is selected by the waveband selector BE from the wavebands 1, 2, 3, and 4 separated in this way, thus the effects same as the third embodiment are acquired. In this case, for example, a plurality of (B, e.g., four) the waveband separators BS can be made up of one integrated device as depicted in one-dot chain line of FIG. 22 and, therefore, a plurality of fibers can be connected to one device, which advantageously achieves smaller size and lower cost.

Fifth Embodiment

Figure 24:
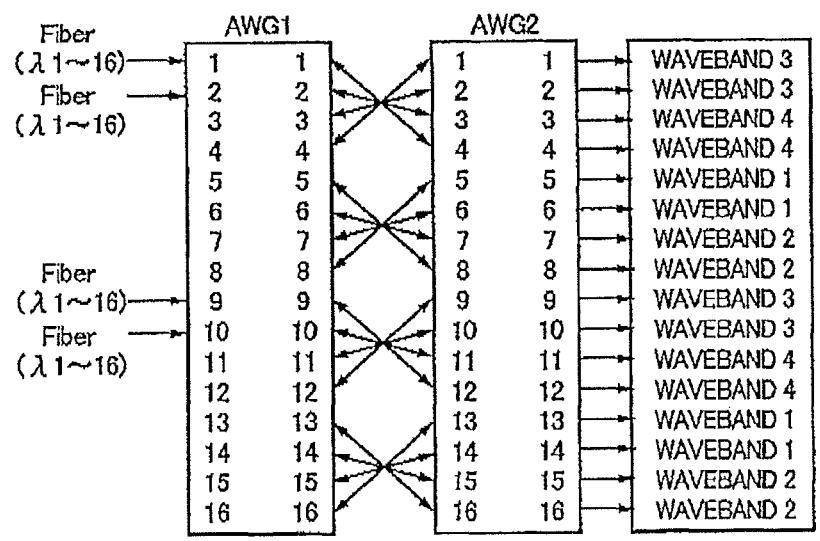
FIG. 24 is a diagram explaining a pair of arrayed waveguide gratings AWG1 and AWG2 in which making up the waveband separator BS and connected to each other in a variable filter of another embodiment (fifth embodiment) of the present invention.

The variable filter TFd of this embodiment is the same as the variable filter of the drop-side optical signal terminating apparatus 10d of the first embodiment depicted in FIG. 11 except that the configurations of the waveband separator BS, the waveband selector BE, the wavelength separator WS, and the wavelength selector WE are different. As depicted in FIG. 24, the waveband separator BS is made up of two arrayed waveguide gratings AWG1 and AWG2 having the output ports 1, 2, 3, and 4 of one grating respectively connected to the input ports 4, 3, 2, and 1 of the other grating; the output ports 5, 6, 7, and 8 of one grating respectively connected to the input ports 8, 7, 6, and 5 of the other grating; the output ports 9, 10, 11, and 12 of one grating respectively connected to the input ports 12, 11, 10, and 9 of the other grating; and the output ports 13, 14, 15, and 16 of one grating respectively connected to the input ports 16, 15, 14, and 13 of the other grating. When sequentially-arranged wavelength division multiplexing light λ1 to λ16 is input to the input ports 1, 2, 9, and 10 of the arrayed waveguide grating AWG1, the dispersively-arranged waveband 1 of λ1, λ5, λ9, and λ13 is output from the output ports 5, 6, 13, and 14 of the arrayed waveguide grating AWG2; the waveband 2 of λ2, λ6, λ10, and λ14 is output from the output ports 7, 8, 15, and 16; the waveband 3 of λ3, λ7, λ11, and λ15 is output from the output ports 1, 2, 9, and 10; and the waveband 4 of λ4, λ8, λ12, and λ16 is output from the output ports 3, 4, 11, and 12. In this case, for example, a plurality of (B, e.g., four) the waveband separators BS can be made up of one integrated device and, therefore, a plurality of fibers can be connected to one device, which advantageously achieves smaller size and lower cost.

Figure 25:
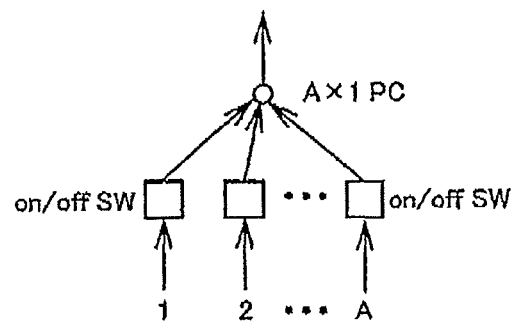
FIG. 25 is a diagram explaining an A-by-1 photocoupler PC making up the waveband selector BE and an on/off optical switch disposed on input side thereof in the variable filter of the fifth embodiment of FIG. 24.

The wavelength separator WS is configured as depicted in FIG. 21. Each of the waveband selector BE and the wavelength selector WE is made up of a coupler type A-by-1 optical switch depicted in FIG. 25. The coupler type A-by-1 optical switch is made up of an A-by-1 photocoupler PC acting as a wave combiner and A on/off optical switches disposed on A input fibers and has a function of blocking unnecessary input out of the A input wavebands (input wavelengths) with the on/off optical switches. Since the configurations of the waveband separator BS, the waveband selector BE, the wavelength separator WS, and the wavelength selector WE of this embodiment have the same functions as the first embodiment, the effects same as the first embodiment are acquired.

Sixth Embodiment

The variable filter TFd of this embodiment is the same as the variable filter of the drop-side optical signal terminating apparatus 10d of the first embodiment of FIG. 11 except that the configurations of the waveband separator BS, the waveband selector BE, the wavelength separator WS, and the wavelength selector WE are different. The waveband separator BS, the waveband selector BE, the wavelength separator WS, and the wavelength selector WE are configured as depicted in FIGS. 20, 18, 21, and 18. In the configurations of the waveband separator BS, the waveband selector BE, the wavelength separator WS, and the wavelength selector WE of this embodiment, as is the case with the first embodiment, after each of the wavelength division multiplexing light is separated into a plurality of wavebands constituting the wavelength division multiplexing light, one waveband selected as a necessary waveband from the plurality of the wavebands is separated into a plurality of wavelength channels constituting the one waveband to select a wavelength to be dropped from the plurality of the wavelength channels and, therefore, the effects same as the first embodiment are acquired.

Seventh Embodiment

Figure 26:
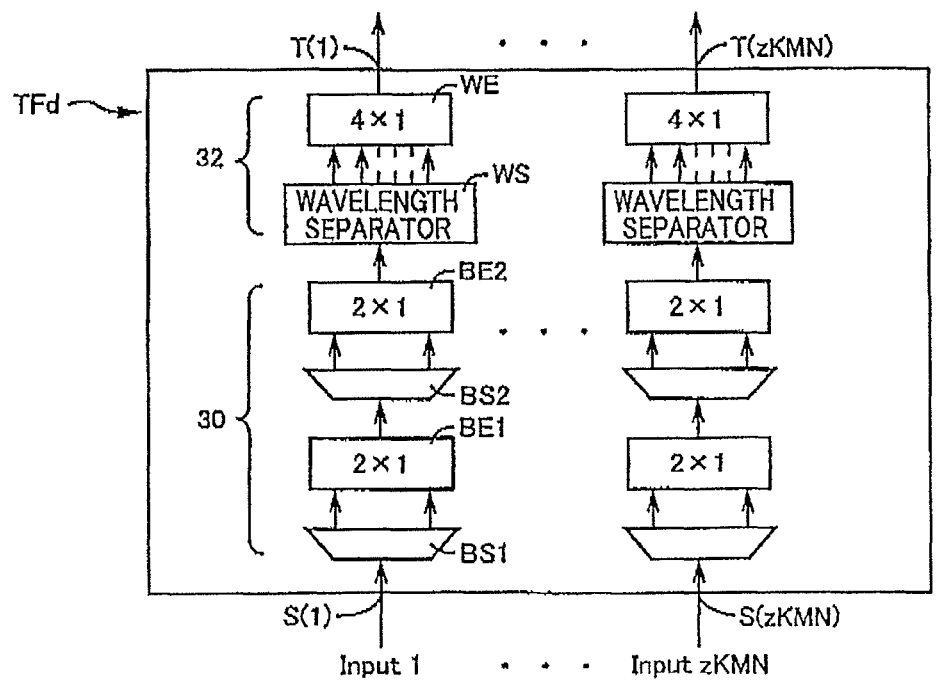
FIG. 26 is a schematic explaining a major configuration of a variable filter in another embodiment (seventh embodiment) of the present invention.
Figure 27:
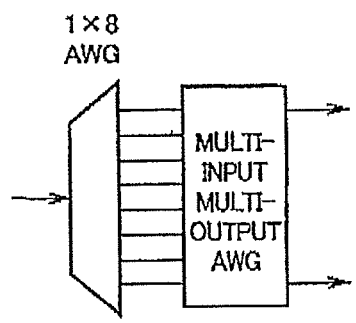
FIG. 27 is a diagram explaining a 1-by-8 cyclic arrayed waveguide grating and an 8-by-2 multi-input multi-output arrayed waveguide grating that are making up a waveband separator BS1 in the variable filter of FIG. 26.
Figure 28:
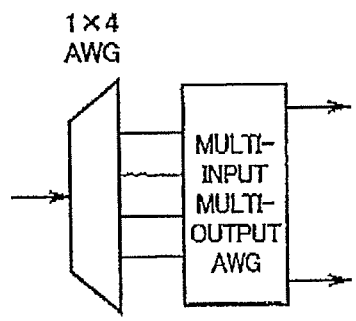
FIG. 28 is a diagram explaining is made up of a 1-by-4 arrayed waveguide grating and a 4-by-2 multi-input multi-output arrayed waveguide grating that are making up a waveband separator BS2 in the variable filter of FIG. 26.
Figure 29:
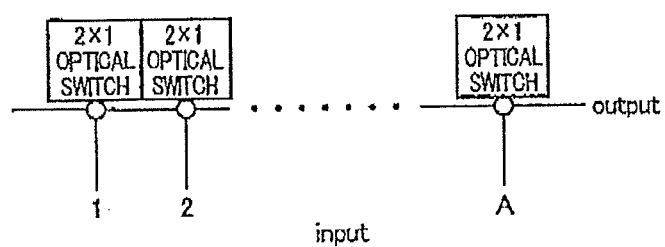
FIG. 29 is a diagram explaining grid-type optical switches that are making up a waveband selector BE1, a waveband selector BE2 and the wavelength selector WE in the variable filter of FIG. 26.

The variable filter TFd depicted in FIG. 26 is the same as those described above in that the variable filter TFd includes the waveband separating/selecting device 30 having the function of separating the wavelength division multiplexing light into a plurality of wavebands making up the wavelength division multiplexing light and selecting one waveband including a drop wavelength from the plurality of the wavebands and the wavelength separating/selecting device 32 having the function of separating the one waveband including the drop wavelength into a plurality of wavelengths making up the one waveband and selecting the drop wavelength from the plurality of the wavelengths. The waveband separating/selecting device 30 of this embodiment has a two-stage configuration including a waveband separator BS1 and a waveband selector BE1; and a waveband separator BS2 and a waveband selector BE2. The waveband separator BS1 is made up of a 1-by-(MN/α) (8) cyclic arrayed waveguide grating AWG and an (MN/α)-by-α multi-input multi-output arrayed waveguide grating AWG as depicted in FIG. 27, for example. The waveband separator BS2 is made up of a 1-by-(MN/β) (4) cyclic arrayed waveguide grating AWG and an (MN/λ)-by-β multi-input multi-output arrayed waveguide grating AWG as depicted in FIG. 28, for example. The waveband selector BE1 and the waveband selector BE2 are made up of those formed by serially connecting grid-type 2-by-1 switches as depicted in FIG. 29. The wavelength separating/selecting device 32 is made up of the wavelength separator WS made up of the 1-by-γ (4) cyclic arrayed waveguide grating AWG depicted in FIG. 14, for example, and the wavelength selector WE made up of the A grid-type 2-by-1 optical switches as depicted in FIG. 29. In this case, α, β, and γ are natural numbers less than MN and satisfy α×β×γ≥M×N.

Figure 30:
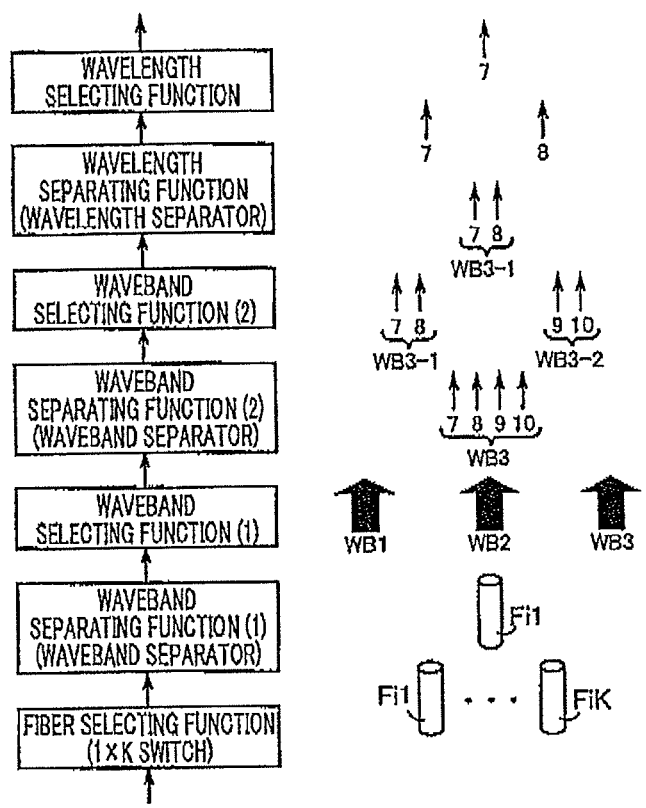
FIG. 30 is a flowchart explaining functions of the variable filter in the seventh embodiment depicted in FIG. 26.

The variable filter TFd of this embodiment configured as described above has functions depicted in FIG. 30. Specifically, the variable filter TFd has the functions of selecting a fiber transmitting the wavelength division multiplexing light including an arbitrary drop wavelength from the K input-side optical fibers Fi1, Fi2, ... FiK with the matrix optical switch MS, separating the wavelength division multiplexing light into a plurality of wavebands making up the wavelength division multiplexing light with the waveband separator BS1, selecting a plurality of wavebands including the drop wavelength from the plurality of the wavebands with the waveband selector BE1, separating the plurality of the wavebands into a plurality of wavebands making up the plurality of the wavebands with the waveband separator BS2, selecting one waveband including the drop wavelength from the plurality of the wavebands with the waveband selector BE2, separating the one waveband into a plurality of wavelengths making up the one waveband with the wavelength separator WS, and selecting the drop wavelength from the plurality of the wavelengths with the wavelength separator WS.

According to the drop-side variable filter TFd of this embodiment, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments.

Eighth Embodiment

Figure 31:
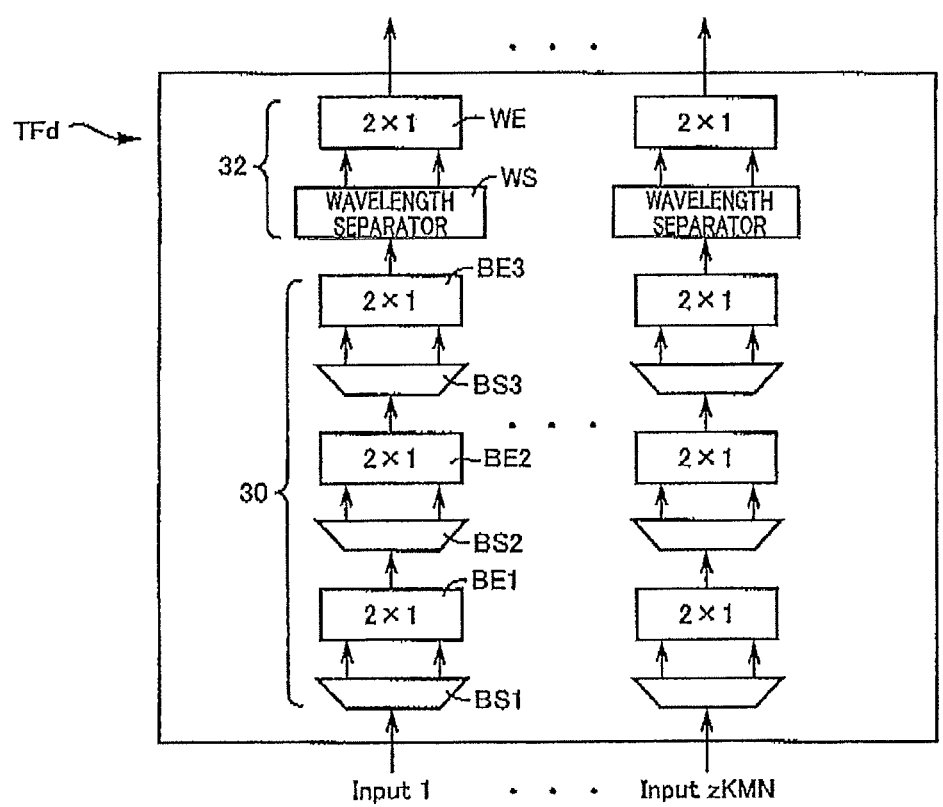
FIG. 31 is a schematic explaining a major configuration of a variable filter in another embodiment (eighth embodiment) of the present invention.
Figure 32:
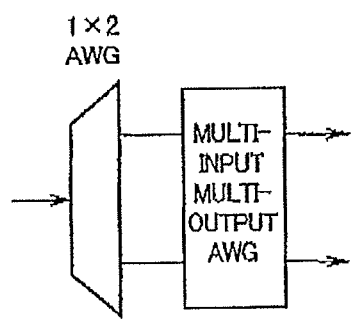
FIG. 32 is a diagram explaining a 1-by-2 cyclic arrayed waveguide grating and a 2-by-2 multi-input multi-output arrayed waveguide grating that are making up a waveband separator BS3 in the variable filter of FIG. 31.

The variable filter TFd depicted in FIG. 31 is the same as those described above in that the variable filter TFd includes the waveband separating/selecting device 30 having the function of separating the wavelength division multiplexing light into a plurality of wavebands making up the wavelength division multiplexing light and selecting one waveband including a drop wavelength from the plurality of the wavebands and the wavelength separating/selecting device 32 having the function of separating the one waveband including the drop wavelength into a plurality of wavelengths making up the one waveband and selecting the drop wavelength from the plurality of the wavelengths. The waveband separating/selecting device 30 of this embodiment has a three-stage configuration including a waveband separator BS1 and a waveband selector BE1; a waveband separator BS2 and a waveband selector BE2; and a waveband separator BS3 and a waveband selector BE3. The waveband separator BS1 and the waveband separator BS2 are made up of 1-by-2α (8) and 1-by-β (4) cyclic arrayed waveguide gratings AWG and 8-by-2 and 4-by-2 multi-input multi-output arrayed waveguide gratings AWG as depicted in FIGS. 27 and 28, for example. The waveband separator BS3 is made up of a 1-by-γ cyclic arrayed waveguide grating AWG as depicted in FIG. 32, for example. The waveband selector BE1, the waveband selector BE2, and the waveband selector BE3 are made up of tree-type A-by-1 (2-by-1) optical switches as depicted in FIG. 13, for example. The wavelength separating/selecting device 32 is made up of the wavelength separator WS made up of a 1-by-δ (2) cyclic arrayed waveguide grating AWG depicted in FIG. 33, for example, and the wavelength selector WE configured as depicted in FIG. 13, for example. In this case, α, β, γ, and δ are natural numbers less than MN and satisfy α×β×γ×δ≥M×N. A variable filter portion can be expanded to four or more stages as in the case of expanding the embodiments described above to the eighth embodiment. Since the same applies to the subsequent embodiments, those expansions will not be described.

According to the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact optical switches to implement the colorless, directionless, and contentionless function, thereby significantly reducing the scale of the optical signal terminating apparatus 10, as described in the above embodiments.

Ninth Embodiment

Figure 34:
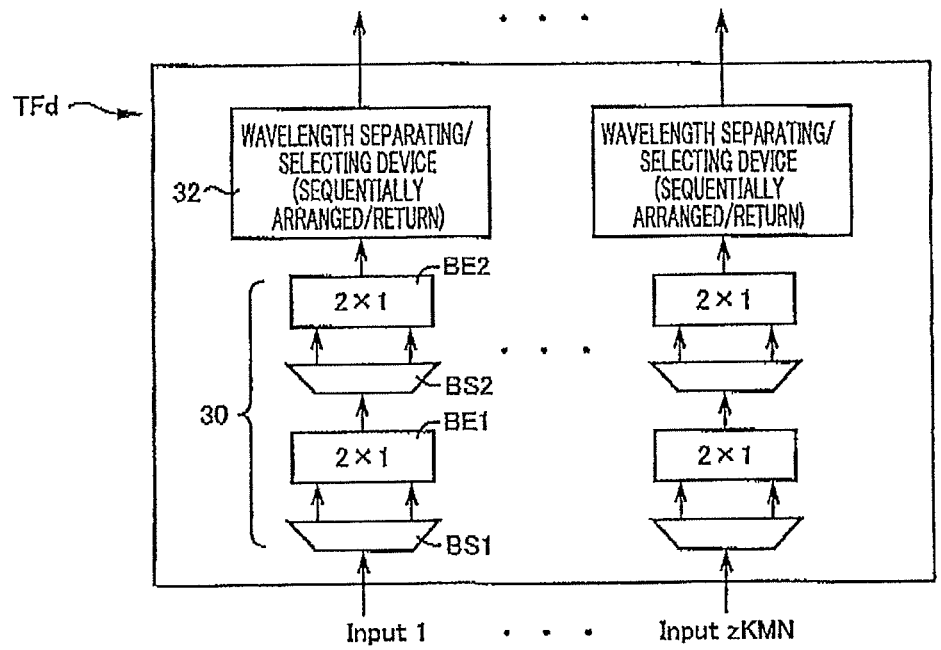
FIG. 34 is a schematic explaining a major configuration of a variable filter in another embodiment (ninth embodiment) of the present invention.

The variable filter TFd depicted in FIG. 34 is configured in the same way as the variable filter of the second embodiment of FIG. 16 except that the waveband separating/selecting device 30 having the function of separating the wavelength division multiplexing light into a plurality of wavebands making up the wavelength division multiplexing light and selecting one waveband including a drop wavelength from the plurality of the wavebands has a two-stage configuration including a waveband separator BS1 and a waveband selector BE1; and a waveband separator BS2 and a waveband selector BE2. The waveband separator BS1 and the waveband separator BS2 are made up of 1-by-(MN/α) (8) and 1-by-(MN/β) (4) cyclic arrayed waveguide gratings AWG and 8-by-α (2) and 4-by-β (2) multi-input multi-output arrayed waveguide gratings AWG as depicted in FIGS. 27 and 28, for example. The waveband selector BE1 and the waveband selector BE2 are made up of grid-type switches formed by serially connecting 1-by-2 optical switches as depicted in FIG. 29, for example. The wavelength separating/selecting device 32 is made up of a 2-by-2γ (8) cyclic arrayed waveguide grating AWG and on/off optical switches depicted in FIG. 19, for example. In this case, α, β, and γ are natural numbers less than MN and satisfy α×β×γ≥M×N.

According to the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, as described in the above embodiments, the selectors for the waveband selection and the wavelength selection can be formed by combining compact switches to implement the colorless, directionless, and contentionless function, thereby significantly reducing the scale of the optical signal terminating apparatus 10.

Tenth Embodiment

Figure 33:
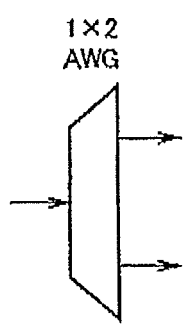
FIG. 33 is a diagram explaining a 1-by-2 cyclic arrayed waveguide grating that is making up a wavelength separator WE1 in the variable filter of FIG. 31.
Figure 35:
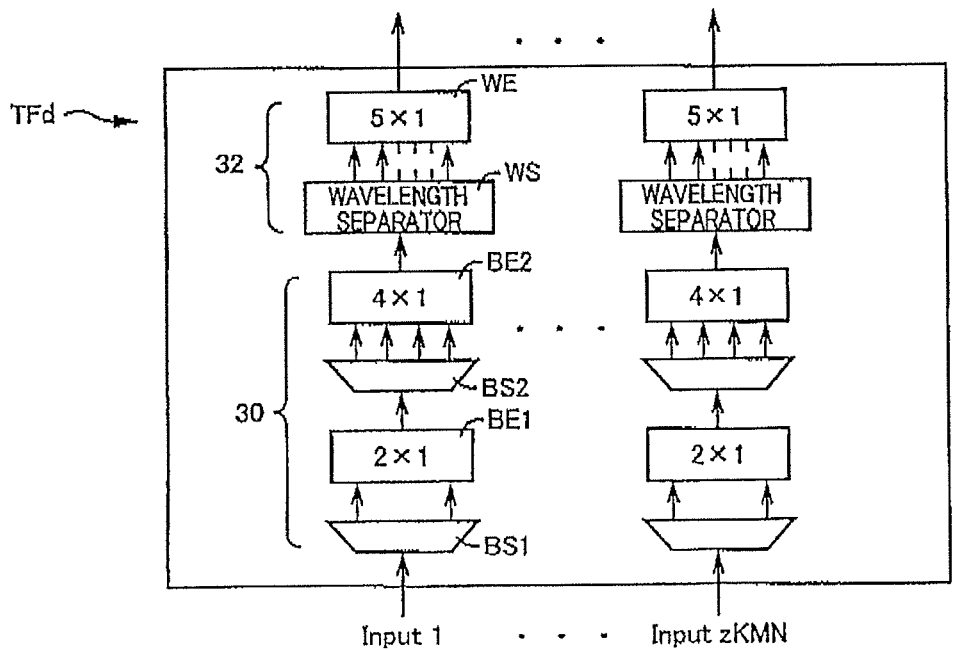
FIG. 35 is a schematic explaining a major configuration of a variable filter in another embodiment (tenth embodiment) of the present invention.

The variable filter TFd depicted in FIG. 35 is the same as the variable filter of the ninth embodiment of FIG. 34 in that the variable filter TFd includes the waveband separating/selecting device 30 with a two-stage configuration having the function of separating the wavelength division multiplexing light into a plurality of wavebands making up the wavelength division multiplexing light and selecting one waveband including a drop wavelength from the plurality of the wavebands and the wavelength separating/selecting device 32 having the function of separating the one waveband including the drop wavelength into a plurality of wavelengths making up the one waveband and selecting the drop wavelength from the plurality of the wavelengths and is different in that the waveband separating/selecting device 30 of this embodiment is made up of a waveband separator BS1 consisting of the 1-by-2 cyclic arrayed waveguide grating AWG depicted in FIG. 33, a waveband separator BS2 consisting of the 1-by-4 cyclic arrayed waveguide grating AWG depicted in FIG. 20, and BE2 consisting of the A grid-type 2-by-1 optical switches depicted in FIG. 29 and that the wavelength separating/selecting device 32 of this embodiment is made up of the wavelength separator WS consisting of the 1-by-5 cyclic arrayed waveguide grating AWG depicted in FIG. 21 and the grid-type 5-by-1 optical switches depicted in FIG. 29.

In the variable filter TFd of this embodiment configured as described above, as well, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments.

Eleventh Embodiment

Figure 36:
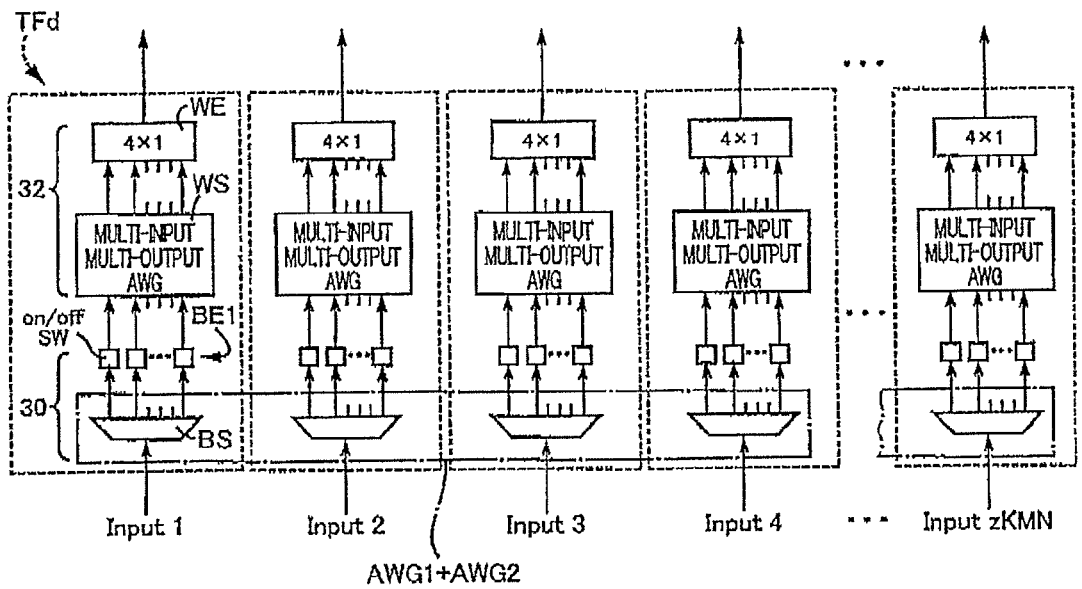
FIG. 36 is a schematic explaining a major configuration of a variable filter in another embodiment (eleventh embodiment) of the present invention.
Figure 37:
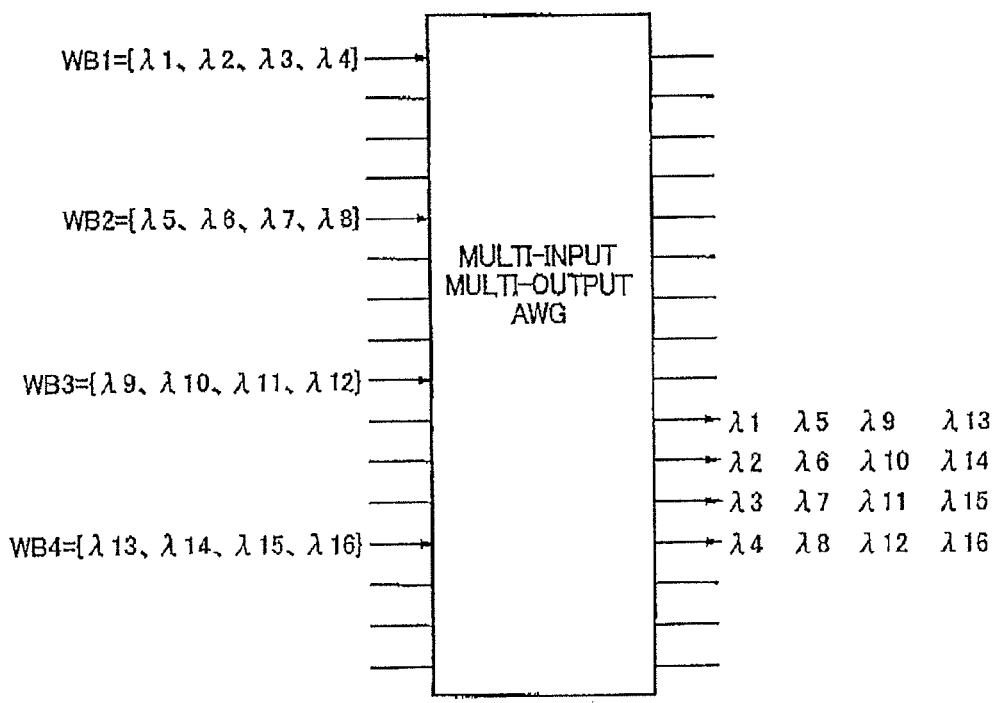
FIG. 37 is a diagram explaining a 16-by-16 multi-input multi-output arrayed waveguide grating that is making up the wavelength separator WS in the variable filter of FIG. 36.

The variable filter TFd depicted in FIG. 36 is the same as those described above in that the variable filter TFd includes the waveband separating/selecting device 30 having the function of separating the wavelength division multiplexing light into a plurality of wavebands making up the wavelength division multiplexing light and selecting one waveband including a drop wavelength from the plurality of the wavebands and the wavelength separating/selecting device 32 having the function of separating the one waveband including the drop wavelength into a plurality of wavelengths making up the one waveband and selecting the drop wavelength from the plurality of the wavelengths. The waveband separating/selecting device 30 of this embodiment is made up of the waveband separator BS consisting of the arrayed waveguide grating AWG1 and the arrayed waveguide grating AWG2 depicted in FIG. 17 and the waveband separator BE consisting of a plurality of on/off optical switches serially inserted in the respective output-side fibers of the waveband separator BS. The wavelength separating/selecting device 32 of this embodiment is made up of the wavelength separator WS consisting of a multi-input multi-output arrayed waveguide grating AWG depicted in FIG. 37 and the wavelength selector WE consisting of the tree-type 4-by-1 optical switch depicted in FIG. 13.

In the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact optical switches to implement the colorless, directionless, and contentionless function, thereby significantly reducing the scale of the optical signal terminating apparatus 10, as described in the above embodiments. According to the waveband separator BS of this embodiment, a plurality of fibers can be connected to one device as depicted in FIG. 17, and a plurality of (four) the waveband separators BS can be advantageously made up of one integrated device as depicted in one-dot chain line of FIG. 36.

Twelfth Embodiment

Figure 38:
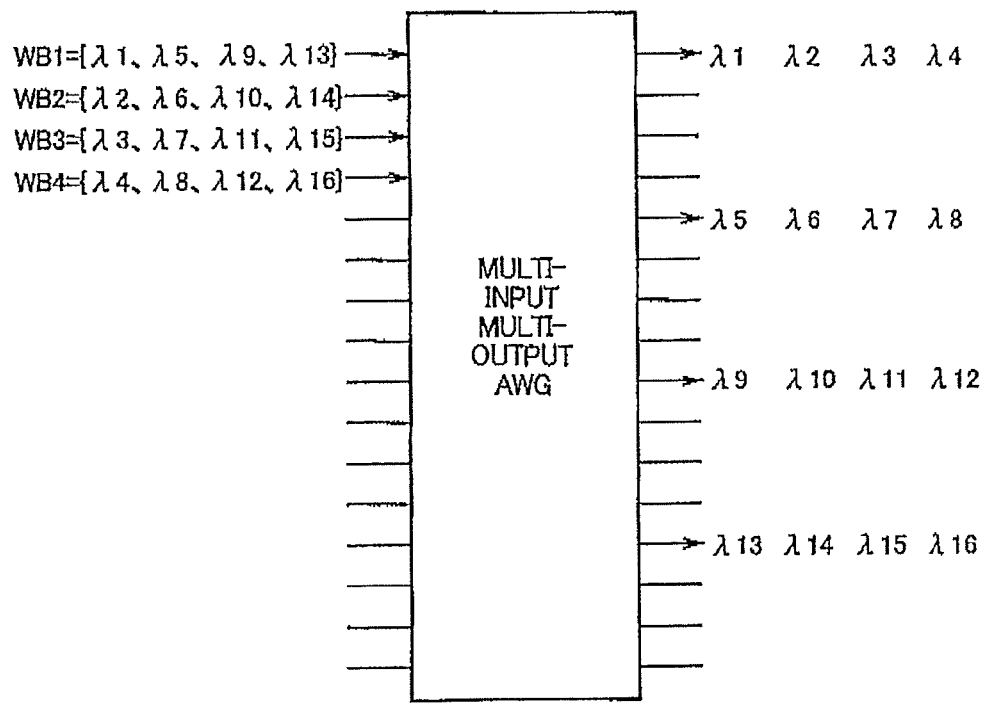
FIG. 38 is a diagram explaining a 16-by-16 multi-input multi-output arrayed waveguide grating that is making up the wavelength separator WS in a variable filter of another embodiment (twelfth embodiment) of the present invention.

The variable filter TFd of this embodiment is configured in the same way as the variable filter of the eleventh embodiment depicted in FIG. 36 except that the waveband separator BS consists of the arrayed waveguide grating AWG1 and the arrayed waveguide grating AWG2 depicted in FIG. 24, that the wavelength separator WS consists of a multi-input multi-output arrayed waveguide gratings AWG depicted in FIG. 38, and that the wavelength selector WE consists of the grid-type 4-by-1 optical switches depicted in FIG. 29.

In the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact optical switches to implement the colorless, directionless, and contentionless function, thereby significantly reducing the scale of the optical signal terminating apparatus 10, as described in the above embodiments. According to the waveband separators BS of this embodiment, a plurality of fibers can be connected to one device as depicted in FIG. 24, and a plurality of (four) the waveband separators BS can be advantageously made up of one integrated device as depicted in one-dot chain line of FIG. 36.

Thirteenth Embodiment

Figure 39:
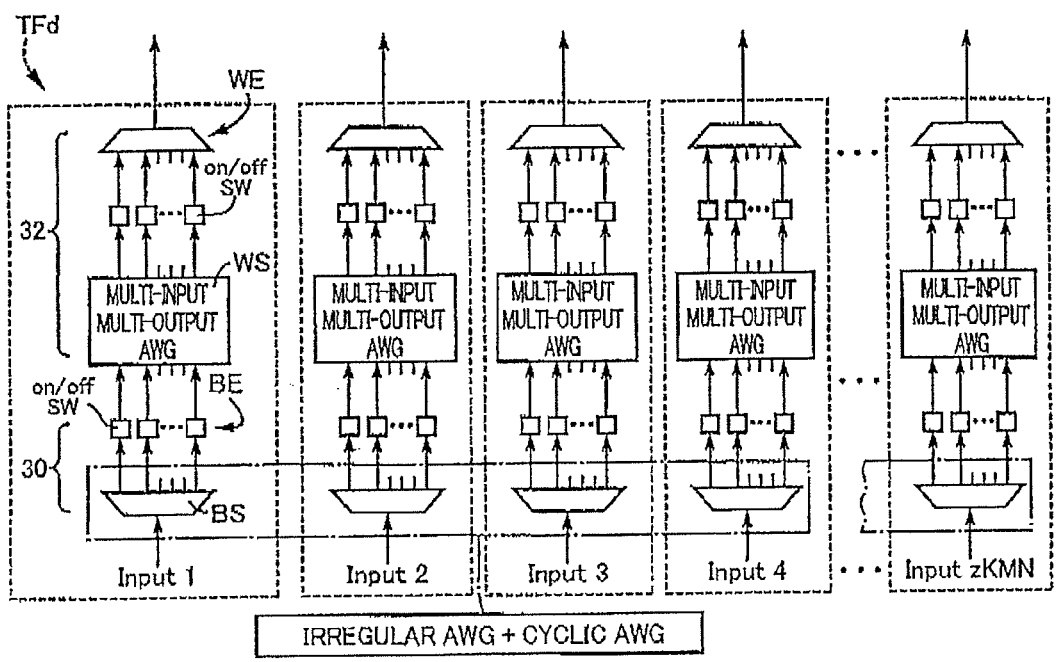
FIG. 39 is a schematic explaining a major configuration of a variable filter in another embodiment (thirteenth embodiment) of the present invention.

The variable filter TFd of FIG. 39 is configured in the same way as the variable filter of the twelfth embodiment depicted in FIG. 36 except that the wavelength selector WE consists of the cyclic arrayed waveguide grating AWG depicted in FIG. 14 and a plurality of on/off optical switches disposed on the input-side fibers of the cyclic arrayed waveguide grating AWG In the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact optical switches to implement the colorless, directionless, and contentionless function, thereby significantly reducing the scale of the optical signal terminating apparatus 10, as described in the above embodiments. According to the waveband separators BS of this embodiment, a plurality of fibers can be connected to one device as depicted in FIG. 24, and a plurality of (four) the waveband separators BS can be advantageously made up of one integrated device as depicted in one-dot chain line of FIG. 39, for example.

Fourteenth Embodiment

Figure 40:
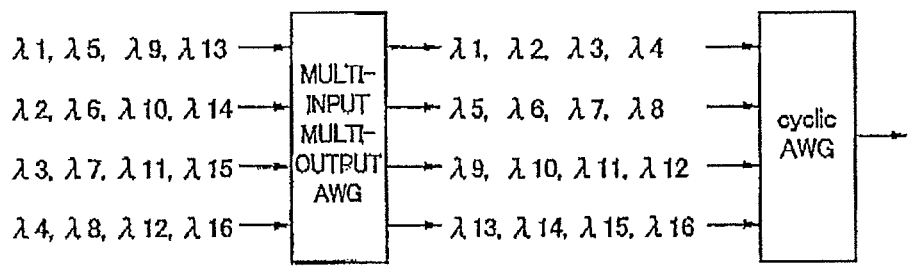
FIG. 40 is a diagram explaining a 4-by-4 multi-input multi-output arrayed waveguide grating and a 4-by-1 cyclic arrayed waveguide grating that are making up the wavelength selector WE in a variable filter of another embodiment (fourteenth embodiment) of the present invention.

The variable filter TFd of this embodiment is configured in the same way as the variable filter depicted in FIG. 39 except that the waveband separator BS consists of the arrayed waveguide grating AWG1 and the arrayed waveguide grating AWG2 depicted in FIG. 24, that the wavelength separator WS consists of the multi-input multi-output arrayed waveguide grating AWG depicted in FIG. 38, and that the wavelength selector WE consists of a multi-input multi-output arrayed waveguide grating AWG and a cyclic arrayed waveguide grating AWG depicted in FIG. 40.

In the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments. According to the waveband separators BS of this embodiment, a plurality of fibers can be connected to one device as depicted in FIG. 24, and a plurality of (four) the waveband separators BS can be advantageously made up of one integrated device as depicted in one-dot chain line of FIG. 39.

Fifteenth Embodiment

Figure 41:
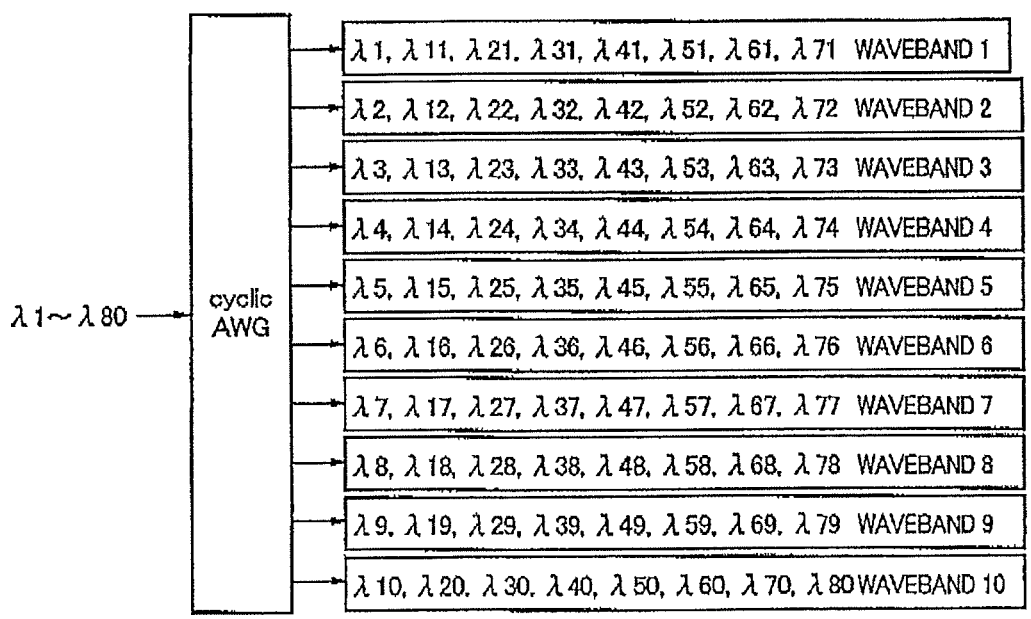
FIG. 41 is a diagram explaining a 1-by-8 cyclic arrayed waveguide grating that is making up the waveband separator BS in a variable filter of another embodiment (fifteenth embodiment) of the present invention.
Figure 42:
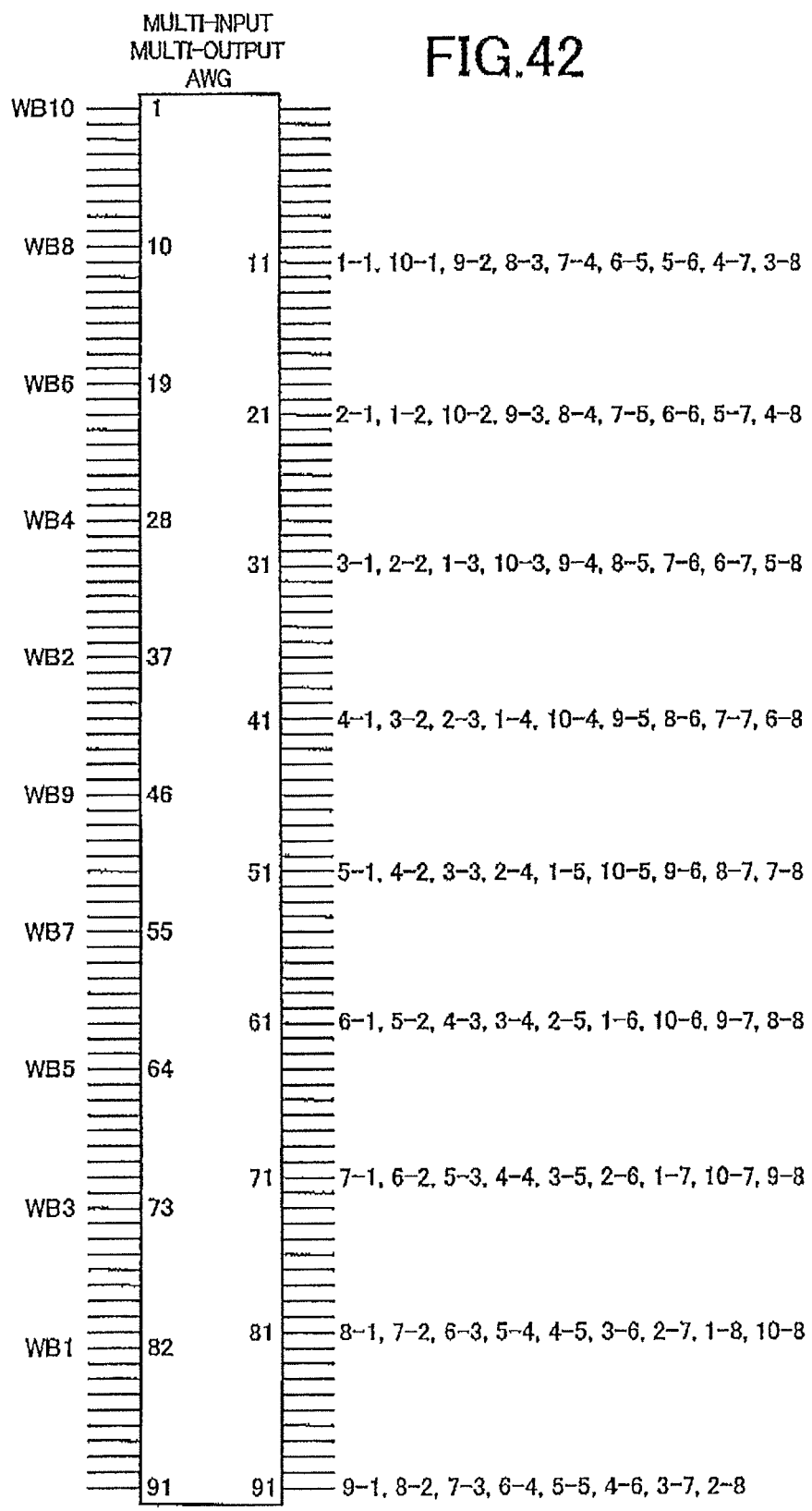
FIG. 42 is a diagram explaining a 91-by-91 multi-input multi-output arrayed waveguide grating that is making up the wavelength separator WS in the variable filter of the another embodiment (fifteenth embodiment) of the present invention.
Figure 43:
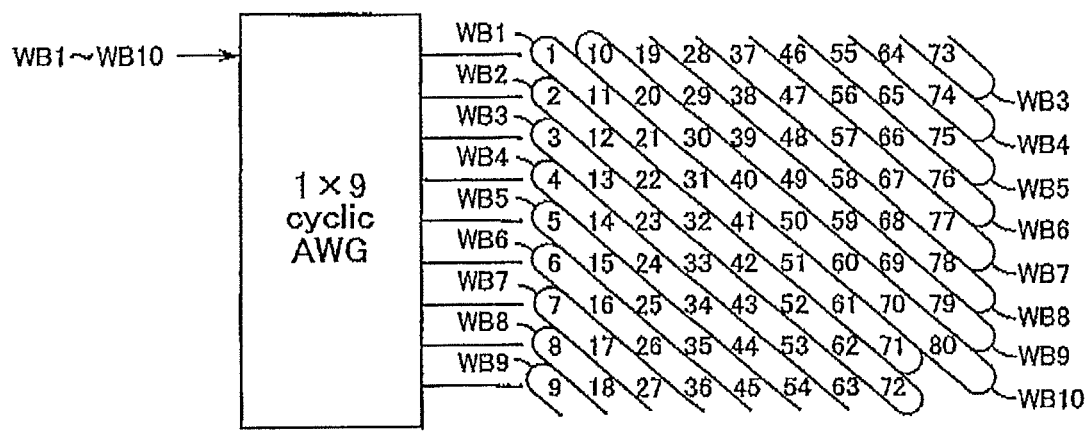
FIG. 43 is a diagram explaining a 1-by-8 cyclic arrayed waveguide grating that is making up the wavelength selector WE in the variable filter of the another embodiment (fifteenth embodiment) of the present invention.

The variable filter TFd of this embodiment is configured in the same way as the variable filter described in the thirteenth embodiment of FIG. 39 except that the waveband separator BS consists of a cyclic arrayed waveguide grating AWG depicted in FIG. 41, that the wavelength separator WS consists of a multi-input multi-output arrayed waveguide grating AWG depicted in FIG. 42, and that the wavelength selector WE consists of a cyclic arrayed waveguide grating AWG depicted in FIG. 43. The cyclic arrayed waveguide grating AWG depicted in FIG. 41, the multi-input multi-output arrayed waveguide grating AWG depicted in FIG. 42, and the cyclic arrayed waveguide grating AWG depicted in FIG. 43 represent the operation when wavelength division multiplexing light of ten wavebands each having eight wavelengths are input.

In the variable filter TFd of this embodiment configured as described above, after each wavelength division multiplexing light is separated into a plurality of wavebands which constitutes the each wavelength division multiplexing light, one waveband selected as a necessary waveband from the plurality of the wavebands is separated into a plurality of wavelength channels which constitutes the one waveband to select a wavelength to be dropped from the plurality of the wavelength channels and, therefore, the selectors for the waveband selection and the wavelength selection can be formed by combining compact optical switches to implement the colorless, directionless, and contentionless function, thereby significantly reducing the scale of the optical signal terminating apparatus 10, as described in the above embodiments.

Sixteenth Embodiment

Figure 44:
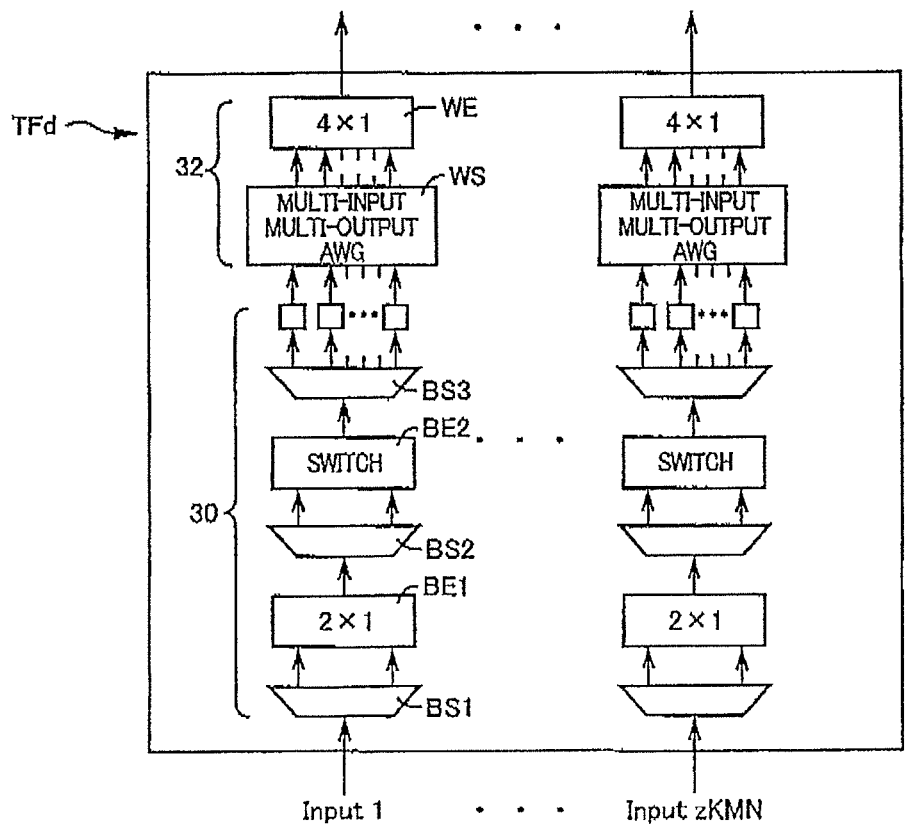
FIG. 44 is a schematic explaining a major configuration of a variable filter in another embodiment (sixteenth embodiment) of the present invention.

The variable filter TFd of FIG. 44 is configured in the same way as the variable filter of the thirteenth embodiment of FIG. 39 except that the waveband separating/selecting device 30 is configured on three stages and that the on/off optical switches of the wavelength separating/selecting device 32 are not included. The waveband separating/selecting device 30 has a three-stage configuration including a waveband separator BS1 and a waveband selector BE1; a waveband separator BS2 and a waveband selector BE2; and a waveband separator BS3 and on/off optical switches. The waveband separator BS 1 and the waveband separator BS2 are made up of 1-by-(MN/α) (8) and 1-by-(MN/β) (4) cyclic arrayed waveguide gratings AWG and (MN/α)-by-α and (MN/β)-by-β multi-input multi-output arrayed waveguide gratings AWG as depicted in FIGS. 27 and 28, for example. The waveband separator BS3 is made up of the 1-by-γ (4) cyclic arrayed waveguide grating AWG and the multi-input multi-output arrayed waveguide grating AWG depicted in FIG. 12 and the on/off switches are disposed on the output-side fibers. The waveband selector BE1 and the waveband selector BE2 are made up of the grid-type 2-by-1 optical switches depicted in FIG. 29. The wavelength separator WS is made up of the arrayed waveguide grating AWG depicted in FIG. 37 and the wavelength selector WE is made up of the grid-type 4-by-1 optical switches depicted in FIG. 29. In this case, $\alpha$, $\beta$, and $\gamma$ are natural numbers less than MN and satisfy $\alpha \times \beta \times \gamma \geq M \times N$.

In the variable filter TFd of this embodiment configured as described above, after each wavelength division multiplexing light is separated into a plurality of wavebands which constitutes the each wavelength division multiplexing light, the wavebands are further separated into a small waveband; one waveband including the drop wavelength is selected from a plurality of the small waveband and separated into a plurality of wavelength channels which constitutes the one waveband; the wavelength to be dropped is selected from the plurality of the wavelength channels; therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments.

Seventeenth Embodiment

The variable filter TFd of this embodiment is the same as the variable filter of the sixteenth embodiment of FIG. 44 except that the waveband separator BS1 and the waveband separator BS2 are made up of the 1-by-2 cyclic arrayed waveguide grating AWG depicted in FIG. 33, that the waveband separator BS3 is made up of the 1-by-4 cyclic arrayed waveguide grating AWG depicted in FIG. 20, and that the wavelength separator WS is made up of the arrayed waveguide grating AWG depicted in FIG. 38.

In the variable filter TFd of this embodiment as well, after each wavelength division multiplexing light is separated into a plurality of wavebands which constitutes the each wavelength division multiplexing light, the wavebands are further separated into a small waveband; one waveband including the drop wavelength is selected from a plurality of the small waveband and separated into a plurality of wavelength channels which constitutes the one waveband; the wavelength to be dropped is selected from the plurality of the wavelength channels; therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments.

Eighteenth Embodiment

Figure 45:
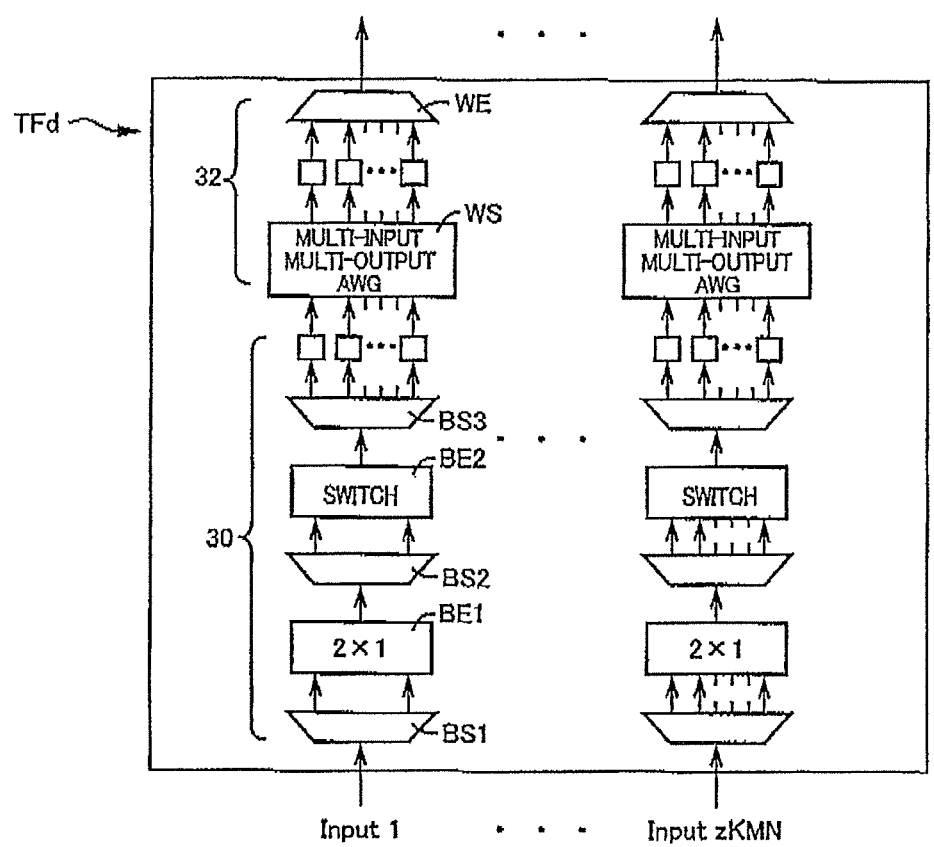
FIG. 45 is a diagram explaining a configuration of a variable filter in another embodiment (eighteenth embodiment) of the present invention.

The variable filter TFd depicted in FIG. 45 is the same as the variable filter described in the sixteenth embodiment of FIG. 44 except that the wavelength selector WE is made up of the cyclic arrayed waveguide grating AWG depicted in FIG. 20 and a plurality of on/off optical switches disposed on the input-side fibers. In the variable filter TFd of this embodiment as well, after each wavelength division multiplexing light is separated into a plurality of wavebands which constitutes the each wavelength division multiplexing light, the wavebands are further separated into a small waveband; one waveband including the drop wavelength is selected from a plurality of the small waveband and separated into a plurality of wavelength channels which constitutes the one waveband; the wavelength to be dropped is selected from the plurality of the wavelength channels; therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments.

Nineteenth Embodiment

The variable filter TFd of this embodiment is the same as the variable filter in the eighteenth embodiment of FIG. 45 except that the waveband separator BS1 and the waveband separator BS2 are made up of the 1-by-2 cyclic arrayed waveguide grating AWG depicted in FIG. 33 and the 1-by-4 cyclic arrayed waveguide grating AWG depicted in FIG. 20, that the waveband separator BS3 is made up of the 1-by-4 cyclic arrayed waveguide grating AWG depicted in FIG. 20 and on/off optical switches respectively disposed on the output side, that the wavelength separator WS is made up of the arrayed waveguide grating AWG depicted in FIG. 38, and that the wavelength selector WE is made up of the 1-by-4 cyclic arrayed waveguide grating AWG and the 4-by-4 multi-input multi-output arrayed waveguide grating AWG depicted in FIG. 12. In the variable filter TFd of this embodiment as well, after each wavelength division multiplexing light is separated into a plurality of wavebands which constitutes the each wavelength division multiplexing light, the wavebands are further separated into a small waveband; one waveband including the drop wavelength is selected from a plurality of the small waveband and separated into a plurality of wavelength channels which constitutes the one waveband; the wavelength to be dropped is selected from the plurality of the wavelength channels; therefore, the selectors for the waveband selection and the wavelength selection can be formed by combining compact optical switches to implement the colorless, directionless, and contentionless function, thereby significantly reducing the scale of the optical signal terminating apparatus 10, as described in the above embodiments.

Twentieth Embodiment

The variable filter TFd of this embodiment is the same as the variable filter in the eighteenth embodiment of FIG. 45 except that the waveband separator BS1 and the waveband separator BS2 are made up of the 1-by-2 cyclic arrayed waveguide grating AWG depicted in FIG. 33 and the 1-by-4 cyclic arrayed waveguide grating AWG depicted in FIG. 20, that the waveband separator BS3 is made up of the 1-by-8 cyclic arrayed waveguide grating AWG depicted in FIG. 41, that the wavelength separator WS is made up of the 91-by-91 arrayed waveguide grating AWG depicted in FIG. 42, and that the wavelength selector WE is made up of the 1-by-9 cyclic arrayed waveguide grating AWG depicted in FIG. 43. In the variable filter TFd of this embodiment as well, after each wavelength division multiplexing light is separated into a plurality of wavebands which constitutes the each wavelength division multiplexing light, the wavebands are further separated into a small waveband; one waveband including the drop wavelength is selected from a plurality of the small waveband and separated into a plurality of wavelength channels which constitutes the one waveband; the wavelength to be dropped is selected from the plurality of the wavelength channels; therefore, the selectors for the waveband selection and the wavelength selection can be formed by combining compact switches to implement the colorless, directionless, and contentionless function, thereby significantly reducing the scale of the optical signal terminating apparatus 10, as described in the above embodiments.

Figure 46:
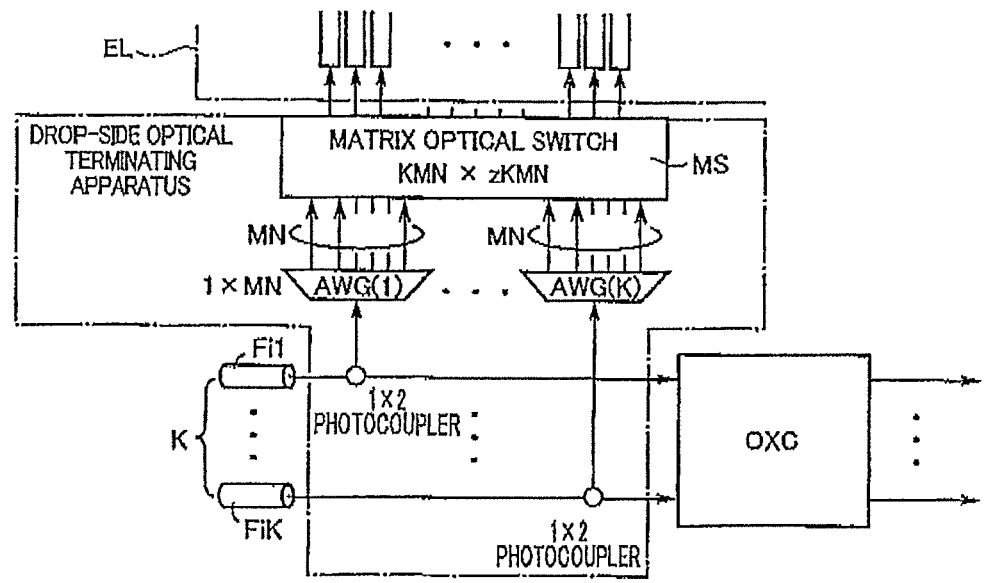
FIG. 46 is a diagram explaining a configuration of a drop-side optical terminating apparatus having a conventional configuration (1).

FIG. 46 depicts a configuration of an optical signal terminating apparatus having a conventional configuration (1). As depicted in FIG. 40, on the drop side of a relay node, K 1-by-MN wavelength separators (e.g., arrayed waveguide gratings AWG) are disposed for separating wavelength division multiplexing lights respectively transmitted via input-side optical fibers Fi1 to FiK into wavelengths and a matrix optical switch MS having a large-scale of KMN-by-zKMN is disposed between the K 1-by-MN wavelength separators and receivers of an electric layer capable of converting zKMN wavelength channels into electric signals. Similarly, on the add side, a matrix optical switch MS having a large-scale of zKMN-by-KMN must be disposed between K wavelength combiners (e.g., arrayed waveguide gratings AWG) for combining added wavelengths into wavelength division multiplexing light to any optical fibers and an electric layer capable of converting zKMN electric signals into wavelength channels.

Figure 47:
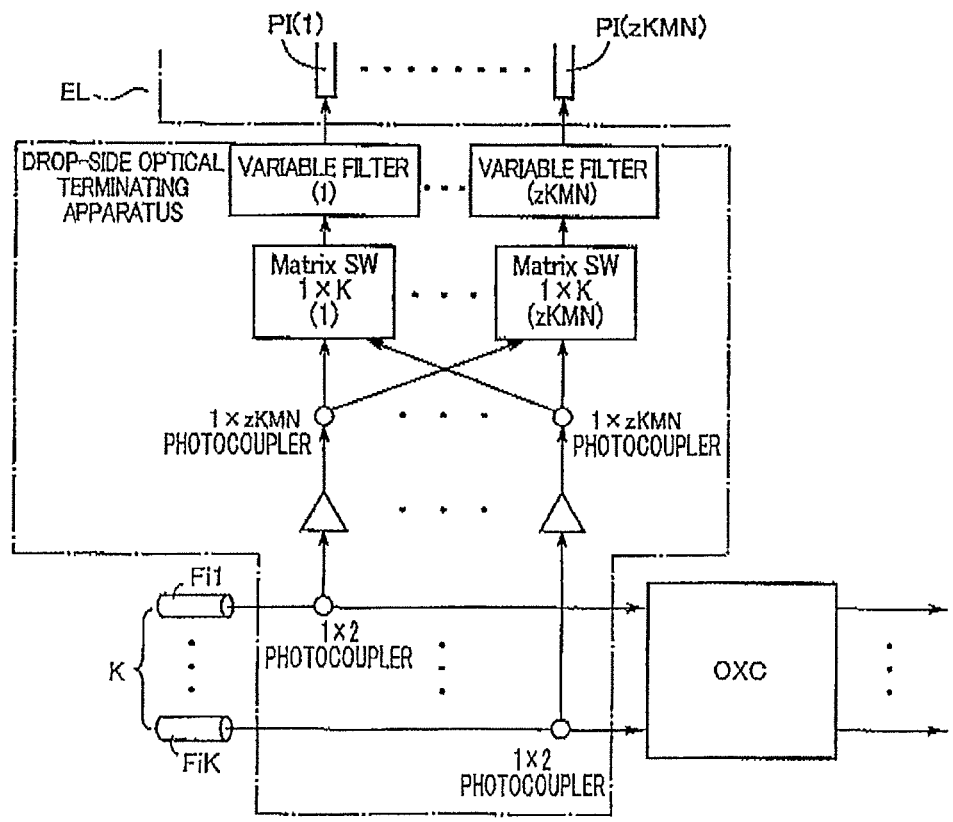
FIG. 47 is a diagram explaining a configuration of a drop-side optical terminating apparatus having a conventional configuration (2).
Figure 48:
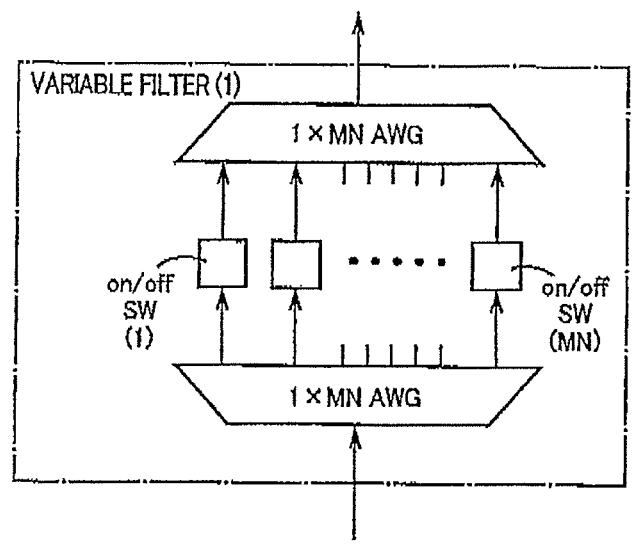
FIG. 48 is a diagram explaining a configuration of a variable filter included in the drop-side optical terminating apparatus having the conventional configuration (2) of FIG. 47.

FIGS. 47 and 48 depict a configuration of an optical signal terminating apparatus having a conventional configuration (2). In FIG. 47, on the drop side of a relay node, zKMN 1-by-K optical switches are disposed for selecting a fiber including a wavelength channel desired to be dropped out of input-side optical fibers Fi1 to FiK and zKMN variable filters (tunable filters) are respectively disposed between the zKMN 1-by-K optical switches and zKMN optical receivers in an electric layer capable of converting zKMN wavelength channels into electric signals. As depicted in FIG. 48, the variable filter is a variable filter formed by disposing MN on/off optical switches between a 1-by-MN-scale wavelength separator (e.g., arrayed waveguide grating AWG) separating a group of wavelength division multiplexing lights selected by the 1-by-K-scale optical switches into wavelengths and an MN-by-1-scale wavelength combiner (e.g., arrayed waveguide grating AWG). Therefore, a huge number of zKMN×MN on/off optical switches are required in total, causing a cost problem. Since the same zKMN variable filters are disposed on the add side at the same time between K K-by-1 optical switches for combining added wavelengths into wavelength division multiplexing light to any optical fibers and the electric layer capable of converting zKMN electric signals into wavelength channels, a huge number of zKMN×MN on/off optical switches are also required in total.

Figure 49:
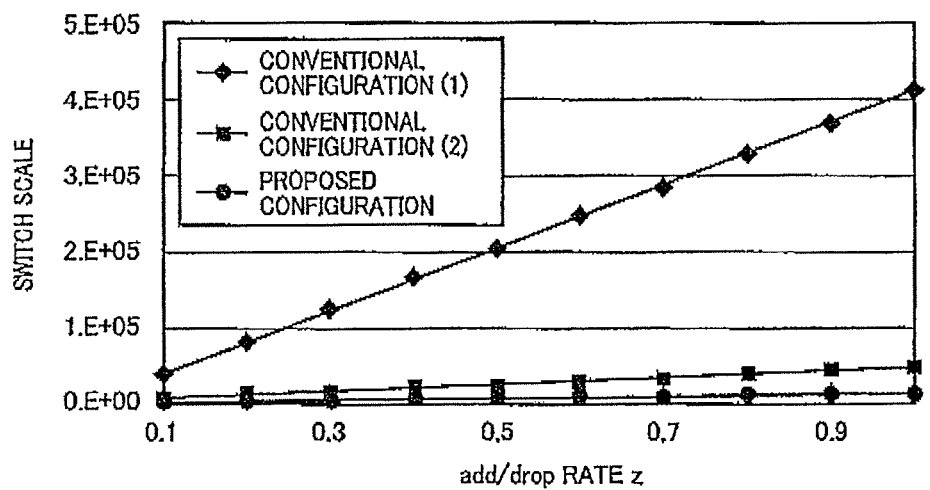
FIG. 49 is a diagram of comparing a switch scale of the optical terminating apparatus between the conventional configurations (1) and (2), and the embodiment of FIG. 11 in relation to the change of an add/drop rate z.
Figure 50:
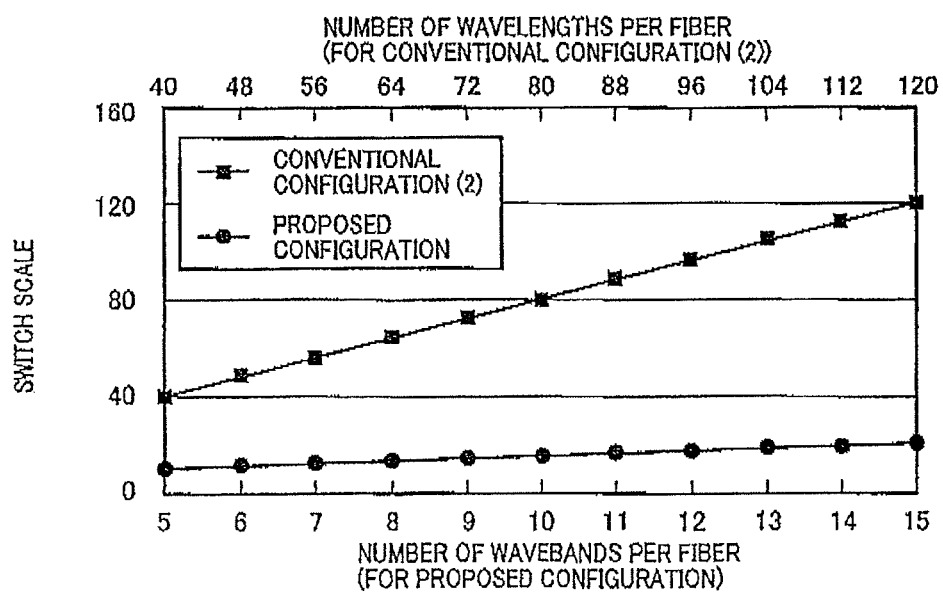
FIG. 50 is a diagram of comparing the switch scale per variable filter between the conventional configuration (2) and the first embodiment in relation to the change in the number M of wavebands per fiber or the number MN of wavelengths per fiber when N is set as a constant value.

The present inventors compared the switch scale of the optical signal terminating apparatus 10 employing the variably filter TFd of the first embodiment of FIG. 11 with the optical signal terminating apparatuses having the conventional configuration (1) of FIG. 46 and the conventional configuration (2) of FIGS. 47 and 48. FIG. 49 depicts change in switch scale caused by changing the add/drop rate z when the number K of fibers is eight; the number M of wavebands per fiber is ten; and the number N of wavelengths per waveband is eight. FIG. 50 depicts change in switch scale caused by changing the number M of wavebands per fiber when the number K of fibers is eight and the number N of wavelengths per waveband is eight.

As depicted in FIG. 49, in terms of the add/drop rate z, the proposed configuration of the optical terminating apparatus TFd of the first embodiment has a switch scale significantly smaller than the conventional configurations (1) and (2) and the switch scale is reduced by about 96% as compared to the conventional configuration (1) and about 80% as compared to the conventional configuration (2). As depicted in FIG. 50, the proposed configuration of the optical terminating apparatus TFd of the first embodiment has a switch scale reduced by about 73% as compared to the conventional configuration (2) regardless of change in the number M of wavebands per fiber.

Although the exemplary embodiments of the present invention have been described with reference to the drawings, the present invention is applicable in other forms.

For example, in the relay node of the embodiments, various changes may be made as needed in the number K of the input-side optical fibers Fi1, Fi2, . . . FiK and the output-side optical fibers Fo1, Fo2, . . . FoK; the number M of wavebands transmitted by one optical fiber; the number N of wavelengths included in one waveband; the add/drop rate y between the waveband level WBL and wavelength level WLL; and the add/drop rate z between wavelength level WLL and the electric level EL. A configuration of wavebands used in a TFd portion of the present invention can be set independently of a waveband configuration in the case of using wavebands in a wavelength cross-connect (OXC) portion.

Although the optical path cross-connect apparatus OXC disposed in the relay node is of the layered type having the waveband path cross-connect portion BXC and the wavelength path cross-connect portion WXC, the optical path cross-connect apparatus OXC may not necessarily be of the layered type and may be a single-layer type or may be a multistage type having three or more layers. A configuration of wavebands used in the TFd portion of the present invention can be set independently of a configuration of wavebands used in the waveband path cross-connect portion BXC.

An optical signal dropped in the node via the TFd portion is blocked before an output fiber so as not to be transmitted to another node via an output fiber connected to OXC in the optical path cross-connect apparatus OXC or a functional portion disposed independently thereof, for example.

Although not exemplarily illustrated one by one, the present invention may variously be modified within a range not departing from the spirit thereof.

NOMENCLATURE OF ELEMENTS

10: optical signal terminating apparatus
10d: drop-side optical signal terminating apparatus
10a: add-side optical signal terminating apparatus
TFd: drop-side variable filter (variable filter)
TFa: add-side variable filter (variable filter)
RN: relay node
EL: electric layer
MS: matrix optical switches
BS: waveband separator
BE: waveband selector
WS: wavelength separator
WE: wavelength selector (drop wavelength selector)

The invention claimed is:

1. An optical signal terminating apparatus for an optical path network comprising: a variable filter selecting an optical signal of a predetermined wavelength path making up any one of a plurality of wavebands included in one wavelength division multiplexing light selected from a plurality of wavelength division multiplexing lights respectively transmitted in parallel via a plurality of optical fibers to a relay node in the optical path network, the variable filter dropping the optical signal to an electric layer, the optical signal terminating apparatus further comprising:
an optical branching device branching the wavelength division multiplexing lights from the plurality of the optical fibers; and
a plurality of matrix optical switches selecting one of a plurality of the wavelength division multiplexing lights branched from the optical branching device to output the wavelength division multiplexing light to the variable filter,
the variable filter including
a waveband separator separating the wavelength division multiplexing light into a plurality of wavebands, a waveband selector selecting one waveband from a plurality of wavebands separated by the waveband separator, a wavelength separator separating one waveband selected by the waveband selector into wavelengths, and a drop wavelength selector selecting and dropping one wavelength from a plurality of the wavelengths separated by the wavelength separator to one of a plurality of receivers included in the electric layer, and the variable filter separating the one wavelength division multiplexing light into a plurality of wavebands, the variable filter selecting one waveband from the plurality of the wavebands, the variable filter selecting and dropping one wavelength from a plurality of wavelengths making up the one selected waveband to one of a plurality of receivers included in the electric layer.

2. The optical signal terminating apparatus for an optical path network of claim 1, wherein the wavelength division multiplexing light is a sequentially-arranged waveband in which wavelengths making up each of a plurality of wavebands which constitute the wavelength division multiplexing lights are sequentially selected such that one band is made up of a plurality of wavelengths having lengths continuous to each other out of a plurality of wavelengths sequentially arranged in order of length of wavelength.

3. The optical signal terminating apparatus for an optical path network of claim 1, wherein the wavelength division multiplexing light is a dispersively-arranged waveband in which wavelengths of a plurality of bands respectively making up a plurality of wavebands which constitute the wavelength division multiplexing lights are sequentially selected such that one band is made up of a plurality of wavelengths having lengths discontinuous to each other out of a plurality of wavelengths sequentially arranged in order of length of wavelength.

4. The optical signal terminating apparatus of claim 1, wherein the optical signal terminating apparatus has an add-side variable filter selecting optical signals of wavelength paths added from the electric layer to combine the selected wavelengths into wavebands and an add-side branching apparatus combining the combined wavebands into wavelength division multiplexing light to transfer the wavelength division multiplexing light to an optical fiber.

* * * * *